United States Patent
Grinolds et al.

(10) Patent No.: US 11,017,358 B2
(45) Date of Patent: May 25, 2021

(54) SCHEDULE DEFRAGMENTATION

(71) Applicant: Clockwise, Inc., San Francisco, CA (US)

(72) Inventors: Michael Grinolds, Mountain View, CA (US); Gary Lerhaupt, San Francisco, CA (US); Matthew Martin, San Francisco, CA (US)

(73) Assignee: Clockwise, Inc., San Francisco, CA (US)

( * ) Notice: Subject to any disclaimer, the term of this patent is extended or adjusted under 35 U.S.C. 154(b) by 580 days.

(21) Appl. No.: 15/933,086

(22) Filed: Mar. 22, 2018

(65) Prior Publication Data
US 2019/0228381 A1 Jul. 25, 2019

Related U.S. Application Data

(60) Provisional application No. 62/621,969, filed on Jan. 25, 2018.

(51) Int. Cl.
*G06Q 10/10* (2012.01)
*H04L 12/18* (2006.01)

(52) U.S. Cl.
CPC ..... *G06Q 10/1095* (2013.01); *H04L 12/1818* (2013.01)

(58) Field of Classification Search
None
See application file for complete search history.

(56) References Cited

U.S. PATENT DOCUMENTS

| | | | | |
|---|---|---|---|---|
| 2003/0149605 A1* | 8/2003 | Cragun | .............. | G06Q 10/1095 705/7.13 |
| 2003/0149606 A1* | 8/2003 | Cragun | ................ | G06Q 10/109 705/7.19 |

(Continued)

FOREIGN PATENT DOCUMENTS

| WO | WO-2013090473 A1 * | 6/2013 | ......... G06Q 10/1093 |
|---|---|---|---|
| WO | WO-2017180409 A1 * | 10/2017 | ......... G06Q 10/1093 |
| WO | WO-2019118224 A1 * | 6/2019 | ......... G06Q 10/1095 |

OTHER PUBLICATIONS

Zweben, Monte, et al. "Scheduling and rescheduling with iterative repair." IEEE Transactions on Systems, Man, and Cybernetics 23.6 (1993): 1588-1596. (Year: 1993).*

(Continued)

*Primary Examiner* — Matthew S Gart
*Assistant Examiner* — Derick J Holzmacher
(74) *Attorney, Agent, or Firm* — Lowenstein Sandler LLP

(57) ABSTRACT

Calendar data including meeting schedules for users may be received by a processing device. A set of user schedules for the users may be generated based upon the calendar data. Each user schedule may contain a set of timeslots that represent a time window and an indication of whether a meeting is scheduled. A first combined score for the set of user schedules may be calculated. One or more rescheduling moves for the scheduled meetings may be determined using a rescheduling rule. A second combined score may be generated based on the rescheduling moves for the set of user schedules. A determination may be made as to whether the second combined score is higher than the first combined score. One or more meeting updates to reschedule the one or more meetings for the users may be generated.

28 Claims, 9 Drawing Sheets

(56) References Cited

U.S. PATENT DOCUMENTS

| | | | |
|---|---|---|---|
| 2007/0021997 A1* | 1/2007 | Hayes, Jr. | G06Q 10/109 705/7.19 |
| 2010/0076802 A1* | 3/2010 | Bhogal | G06Q 10/109 705/7.19 |
| 2010/0293029 A1* | 11/2010 | Olliphant | G06Q 10/109 705/7.19 |
| 2011/0184943 A1* | 7/2011 | Norton | G06Q 10/02 707/723 |
| 2012/0060166 A1* | 3/2012 | Jardine | G06Q 10/109 718/104 |
| 2012/0143638 A1* | 6/2012 | Kho | G06Q 10/02 705/5 |
| 2015/0006221 A1* | 1/2015 | Mermelstein | G06Q 10/1095 705/7.19 |
| 2015/0058057 A1* | 2/2015 | Egan | G06Q 10/1095 705/7.19 |
| 2016/0350720 A1* | 12/2016 | Moorjani | G06Q 10/1095 |
| 2017/0300868 A1 | 10/2017 | Johnson et al. | |
| 2017/0300869 A1* | 10/2017 | Johnson | G06Q 10/1093 |
| 2018/0341925 A1* | 11/2018 | Leske | G06Q 10/1095 |

OTHER PUBLICATIONS

Kozierok, Robyn, and Pattie Maes. "A learning interface agent for scheduling meetings." Proceedings of the 1st international conference on Intelligent user interfaces. 1993. (Year: 1993).*

Beard, David, et al. "A visual calendar for scheduling group meetings." Proceedings of the 1990 ACM conference on Computer-supported cooperative work. 1990. (Year: 1990).*

* cited by examiner ns
SCHEDULE DEFRAGMENTATION

CROSS REFERENCE TO RELATED APPLICATIONS

This application claims the benefit of priority from U.S. Provisional Application No. 62/621,969, filed on Jan. 25, 2018, which is herein incorporated by reference.

TECHNICAL FIELD

This disclosure relates to the field of optimizing meeting schedules for a calendaring system, and in particular to determining and generating meeting schedule updates for users of a calendaring system.

BACKGROUND

In a business environment employees may participate in various meetings throughout the day and/or week. Meetings, although productive, may be scheduled during unfavorable times for meeting attendees. Scheduling and rescheduling meetings for employees is generally controlled by the meeting organizer and/or an administrator. Meeting organizers may be limited by their rescheduling options. Additionally, it may be difficult to accommodate each employee's meeting preferences and/or optimize meeting schedules for an entire team when scheduling and rescheduling meetings. Managing meeting schedules and employee meeting preferences for large teams becomes difficult when an administrator has to visualize all of the meetings for the team and collectively move meetings while satisfying employee preferences and meeting constraints. Moreover, it is combinatorically prohibitive for individuals to optimize the locations and/or times of several people. As a result, administrators often focus optimization of employee schedules to a few key employees and/or a few specific meetings, leaving most other employees without optimized schedules and having to reschedule potential conflicting meetings that may occur due to optimizing the few key employees.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
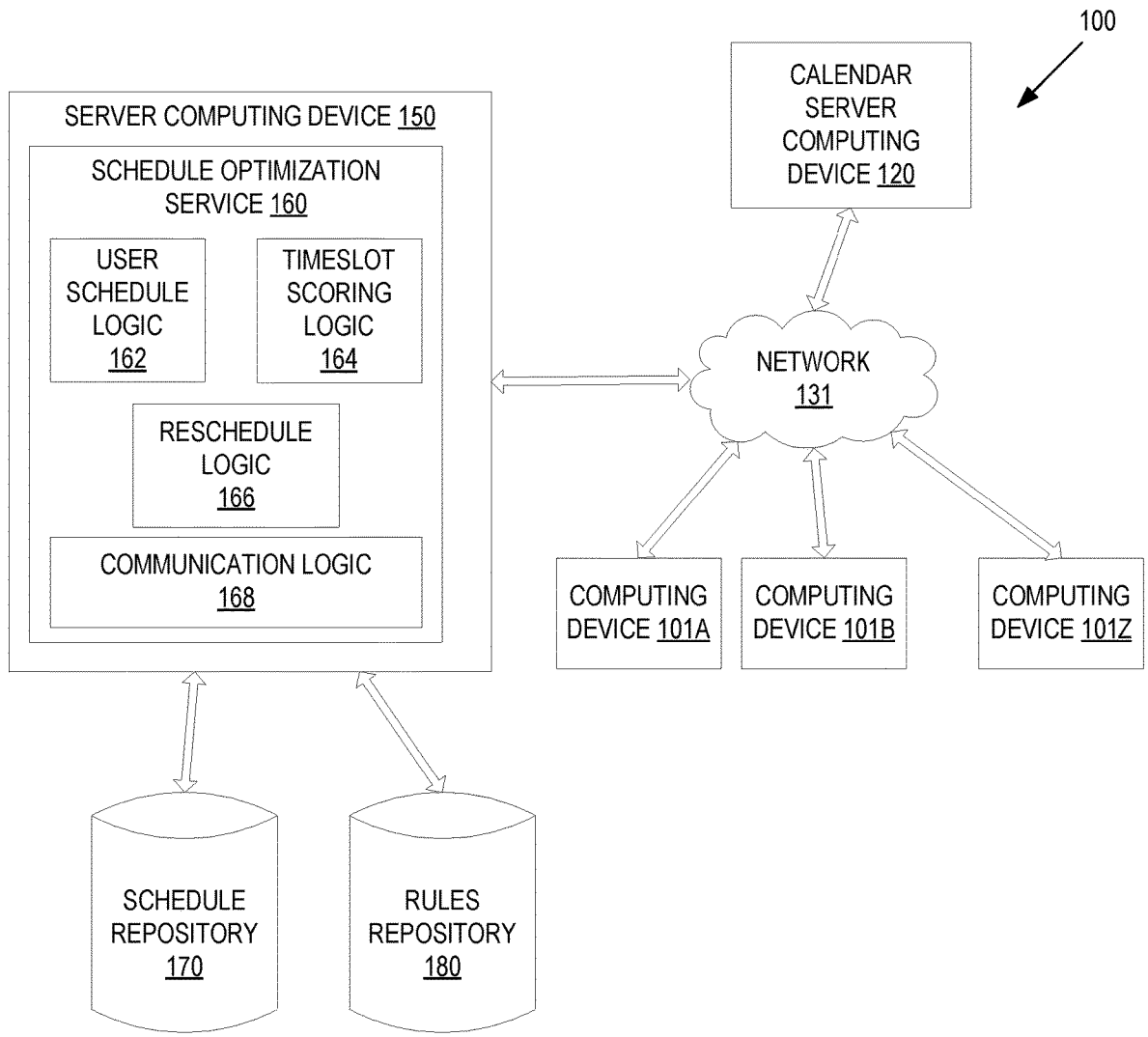
FIG. 1 is a block diagram illustrating a network environment in which embodiments of the present invention may operate.

Embodiments are described for generating meeting schedules optimized for one or more users. A meeting may be any scheduled interaction or scheduled event for one or more users. Examples of meetings may include team meetings with users of one or more work groups, company-wide meetings for employees of a company, and one-on-one meetings between two users. Meetings may also represent a reservation of time for a single user, such as a personal appointment, traveling time, or any other dedicated block of time that involves a single participant. Meetings may include a participant list of scheduled attendees, a meeting location describing a specific meeting room or conference call line or link, and a scheduled start and end time for the meeting. Meeting participants are users that are scheduled to participate in the meeting. Meeting participants may include users from a specific team, department, and company, and users from an external team, department, and company.

When people collaborate together in a work environment, accomplishing goals is achieved through a combination of individual work to make forward progress and multi-person meetings to ensure that everyone is coordinated and each individual contribution fits together. Unfortunately, it is difficult to balance the amount of individual work time and meeting time because a) making progress on individual work often requires large blocks of contiguous time, b) meetings with multiple people can greatly constrain when a meeting can occur due to the presence of other meetings, different work times, different time zones and/or other obligations, and c) schedules are dynamic and new meetings can be added to one's calendar at any time. Accordingly, individuals on a team often find themselves without enough contiguous blocks of time to accomplish their personal work. Individuals may find themselves in such a situation not necessarily because they have too many meetings, but rather because their meetings are placed at times that leave gaps between them that are insufficiently long for personal work. Embodiments discussed herein provide a system that is capable of defragmenting the schedules of one or more individuals to optimize meeting schedules.

Typically, meeting schedules for users are managed by calendar software that maintains an electronic version of a calendar and scheduled meetings for the user. Examples of calendaring software include Microsoft Exchange Server® and Google Calendar® which are designed to manage meeting schedules for multiple users.

In an embodiment, a schedule optimization service may receive calendar data for one or more users. The calendar data received may include meeting data describing meeting schedules for each of the one or more users. The service may generate a set of user schedules for the one or more users based upon the received calendar data. Each of the user schedules may comprise a set of timeslots, where each timeslot represents a time window within a day and each timeslot contains an indication of whether a meeting is scheduled during that timeslot for the user and/or a meeting identifier if a meeting is scheduled. The service calculates scores for the set of timeslots for the one or more users based upon meeting preferences and the scheduled meetings within the set of timeslots. The service calculates a first combined score based on the scores for the sets of timeslots. The service determines one or more first rescheduling moves for the scheduled meetings within the set of timeslots using a first rescheduling rule. The service generates recalculated scores for the set of timeslots based at least in part upon the one or more first rescheduling moves. The service calculates a second combined score based on the recalculated scores for the sets of timeslots. The service determines whether the one or more first rescheduling moves causes the second combined score to be higher than the first combined score (e.g., whether the first rescheduling moves increase the scores for the sets of timeslots in the aggregate). Responsive to determining that the second combined score is higher than the first combined score, the service generates one or more meeting updates to reschedule one or more meetings in the set of user schedules based on the one or more first rescheduling moves.

In an embodiment, the schedule optimization service may receive calendar data from an external calendar server. For example, the schedule optimization service may receive calendar data from a Microsoft Exchange Server.

In an embodiment, the schedule optimization service may send the one or more meeting updates to the calendar server to update the meeting schedules of the one or more users.

In an embodiment, meeting preferences may include user specific meeting preferences for at least one of the one or more users. In an embodiment, the meeting preferences may include preferences specifying at least one of preferred meeting times, preferred number of consecutive meetings, and preferred timeslots to be free of meetings.

In an embodiment, the schedule optimization service, when generating the set of user schedules for the one or more users based upon the calendar data, may implement deduplication to generate a single meeting event from the calendar data that includes multiple meeting events for multiple users that represent the single meeting event.

In an embodiment, when calculating the scores for the sets of timeslots, the schedule optimization service may, for each timeslot in each set of timeslots, calculate a first preference score based upon a first preference from the meeting preferences, calculate a second preference score based upon a second preference from the meeting preferences, and aggregate the first preference score and the second preference score to generate a combined score for the timeslot. The schedule optimization service may aggregate the combined scores from the timeslots in the set of timeslots to generate the score for the set of timeslots.

In an embodiment, the first preference score may be assigned a first weight and the second preference score may be assigned a second weight based upon relative importance of the first and second preferences.

In an embodiment, the first rescheduling rule may be configured to alter the duration of meetings based upon at least one of: meeting preferences, meeting constraints, and available free timeslots.

In an embodiment, when generating the recalculated scores for the sets of timeslots based upon the one or more first rescheduling moves, the schedule optimization service may for a subset of timeslots in the set of timeslots that are part of the one or more rescheduling moves, generate a recalculated timeslot score. The schedule optimization service may aggregate the recalculated timeslot scores and previously calculated timeslot scores for timeslots other than the subset of timeslots to generate the recalculated score for the set of timeslots.

In an embodiment, the schedule optimization service may further generate an updated set of timeslots for the scheduled meetings based upon the first rescheduled moves. The schedule optimization service may determine one or more second rescheduling moves for the scheduled meetings with the updated set of timeslots in a second rescheduling algorithm. The schedule optimization service may generate a second recalculated score based upon the one or more second rescheduling moves. The schedule optimization service may determine whether the one or more second rescheduling moves increases the meeting preferences for a majority of the one or more users. Responsive to determining that the one or more second rescheduling moves increases the scores for the updates set of timeslots for the one or more users, the schedule optimization service may generate the one or more meeting updates to reschedule the one or more meetings in the set of user schedules based on the one or more second rescheduling moves.

In an embodiment, the first rescheduling rule may be based upon generating two or more consecutive timeslots within the user schedules for the one or more users that are free of meetings.

In an embodiment, the first rescheduling rule may be based upon swapping two or more meetings in the user schedules in order to increase the scores for the sets of timeslots.

Embodiments describe iteratively determining rescheduling moves based on different rescheduling algorithms. This may provide overall increased optimization while decreasing overall computational resources used to determine the meeting updates. Conversely, conventional rescheduling techniques may attempt to determine meeting updates based on a holistic approach or a single pass technique, where desired meeting and user preferences are incorporated into determining optimal meeting schedules. However, determining meeting updates that incorporate multiple preferences into a single pass may result it large sets of permutations that consume large amounts of computational resources. The embodiments described herein may utilize multiple iterations of rescheduling moves focusing on a specific rescheduling algorithm during each iteration. This may result in a reduced number of possible permutations for each iteration and saved computing resources for each iteration.

FIG. 1 is a block diagram illustrating a network environment 100 in which embodiments of the present invention may operate. In one embodiment, network environment 100 includes one or more computing devices (e.g., computing devices 101A-Z, server computing device 150, and calendar server computing device 120), and network 131 over which computing devices 101A-Z, calendar server computing device 120, and server computing device 150 may communicate. Any number of computing devices 101A-Z can communicate with each other and/or with calendar server computing device 120 through network 131. The network 131 can include a local area network (LAN), a wireless network, a telephone network, a mobile communications network, a wide area network (WAN) (e.g., such as the Internet) and/or similar communication system. The network 131 can include any number of networking and computing devices such as wired and wireless devices.

The computing devices 101A-Z, calendar server computing device 120, and server computing device 150 may include a physical machine and/or a virtual machine hosted by a physical machine. The physical machine may be a rackmount server, a desktop computer, or other computing device. In an embodiment, the computing devices 101A-Z, calendar server computing device 120, and server computing device 150 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Network environment 100 includes one or more computing devices 101A-Z that represent one or more computers used by the one or more users. The one or more computing devices 101A-Z may implement calendar client applications for viewing and scheduling meetings within a calendar service on the calendar server computing device 120. The calendar server computing device 120 may implement a time-management and scheduling calendar service such as Google Calendar or Microsoft Exchange Server.

Server computing device 150 includes a schedule optimization service 160 configured to optimize user schedules of meetings based upon meeting preferences of users. In an embodiment, the schedule optimization service 160 may include user schedule logic 162, timeslot scoring logic 164, reschedule logic 166, and communication logic 168. The server computing device 150 may communicate with schedule repository 170 that stores generated user schedules and rule repository 180 that stores meeting rescheduling rules. The schedule repository 170 and the rule repository 180 may include magnetic storage units, optical storage units, solid state storage units, storage servers, or similar storage units. The schedule repository 170 and the rule repository 180 can be monolithic devices or a distributed set of devices. In some embodiments, the schedule repository 170 and the rule repository 180 may be implemented using a storage area network (SAN) or network attached storage (NAS).

In an embodiment, the schedule repository 170 may store received calendar data from the calendar server computing system 120, user data identifying the different users associated with calendar data, generated user schedules for the users, and/or meeting events that represent the different scheduled meetings for users. Each of the user schedules stored in the schedule repository 170 may represent a user schedule of free and occupied time for a specific user. For instance, a user schedule may include a schedule of timeslots that each represents a specific time window within a workweek and/or weekend. If for the user a meeting is scheduled during a specific timeslot, then the specific timeslot may indicate the meeting event that is scheduled during that particular timeslot. The meeting event may be identified by a unique meeting identifier (ID). Timeslots may include a reference to a meeting event that represents the scheduled meeting for the user. The meeting event may be stored within the schedule repository 170.

In an embodiment, the rules repository 180 may store rescheduling rules that describe meeting rescheduling techniques, meeting preferences that describe scheduling preferences for meetings for users, and/or scoring rules that describe different scoring metrics for the different meeting preferences. Rescheduling rules may include rules based on different rescheduling strategies. For instance, one rescheduling rule may be based on a strategy of moving meetings to free timeslots that have been identified as preferable for meetings. Another rescheduling rule may be based upon a strategy of swapping two or more meetings that have overlapping users in order to optimize the user schedules. Further examples of rescheduling rules are discussed in detail below. Rescheduling rules may be ranked in some embodiments. Higher ranked rescheduling rules may be applied before lower ranked rescheduling rules. Alternatively, lower ranked rescheduling rules may be applied before higher ranked rescheduling rules.

Rescheduling rules may use meeting preferences for users, scoring metrics, and/or meeting event constraints associated with the meetings to determine how to reschedule meetings. Each user may have meeting preferences that may be associated with different scoring metrics. For example, user A may have a meeting preference that meetings be held in the afternoon and a scoring metric may be associated with the afternoon meeting preference that assigns a number of points to each morning timeslot that is free of meetings for user A. The rescheduling rules may take into account the afternoon meeting preference for user A and use the scoring metric for the afternoon meeting preference when determining which meetings to reschedule.

Other user preferences may include, but are not limited to, time zone preferences, lunch break preferences, location preferences, and personal appointments and other meetings that may be associated with a user's personal calendar. For example, time zone preferences may be used to determine preferred working times for scheduling meetings. Lunch break preferences may be used to block off certain time from meetings to allow for lunch. Lunch break preferences may be based on historical data related to when a user takes lunch or may be based on explicitly defined lunch times. Location preferences may be based on a derived user location, such as a user's geo-location associated with his/her smartphone or computer. Location preferences may be especially useful when scheduling and/or rescheduling a meeting because it may be used to determine whether a new meeting timeslot is feasible for participants based on where they are located. For instance, if a new meeting requires several users to travel 30+ minutes to reach the meeting location, then the meeting may not be scheduled as part of back-to-back meetings where the meetings are in different locations far from each other.

Additionally, meeting event constraints may be associated with one or more potential meetings to be rescheduled. For example, an all-hands meeting may have date/time constraints or location constraints which may limit potential rescheduling opportunities for the all-hands meeting.

In an embodiment, the communication logic 168 may send and receive data associated with user schedules, meeting updates, and/or calendar data. Calendar data may be received from the calendar server computing system 120 via the network 131. User data and/or user schedule data may be sent to and received from the schedule repository 170. Rescheduling rules, meeting preferences, scoring metrics and/or meeting event constraints may be sent to and received from the rules repository 180.

The user schedule logic 162 may be configured to generate user schedules for users. In an embodiment, the user schedule logic 162 may receive calendar data for the users from the calendar server computing device 120 and may identify the users and a set of calendar events associated with the users. Each user schedule generated may include a set of timeslots that represent specific time windows within a duration of time. For instance, a workday may be divided into a series of timeslots where each timeslot represents a 30 minute time window within the workday. Each timeslot may include information describing whether a meeting is scheduled during the timeslot and/or a meeting ID for the meeting. For example, if a timeslot represents a time window of Monday from 9:00 AM to 9:30 AM, then the timeslot may include information indicating whether the timeslot is free of a meeting or whether the timeslot has a meeting scheduled for the user. In other embodiments, timeslots may be configured to represent larger or smaller time windows, such as 15-minute windows or 1-hour windows. After generating the set of user schedules and the meeting events, the user schedule logic 162 may store a copy of the set of user schedules in the schedule repository 170.

Calendar data received from the calendar server computing device 120 may to include multiple copies of a meeting event for each user participating in the meeting event. For example, if meeting A has 10 users participating the in meeting, then the calendar data may include 10 instances of meeting A, each instance associated with each user participant. In an embodiment, the user schedule logic 162 may be configured to deduplicate the meeting events such that each user participant for the meeting event references a single meeting event that may be identified using a unique event identifier. By doing so, the user schedule logic 162 may save storage resources by removing duplicate data and may conserve processing resources when rescheduling meeting events by having only one instance of a meeting event to manage when updating meeting schedules instead of having to manage multiple meeting event instances for each user participant.

After the set of user schedules are generated by the user scheduling logic 162, the timeslot scoring logic 164 may calculate an optimization score for each user schedule. The optimization scores may represent a measurement of how optimized a user's meeting schedule is relative to the user's meeting preferences. In an embodiment, the timeslot scoring logic 164 may use meeting preferences associated with the users and scoring metrics associated with the meeting preferences to calculate an optimization score for each user schedule. The timeslot scoring logic 164 may iterate through each timeslot within the set of timeslots for a given user schedule. For each timeslot, the timeslot scoring logic 164 may determine which meeting preferences to evaluate for the user and may apply the associated scoring metric to calculate a timeslot score for the current timeslot. The timeslot scoring logic 164 may, after iterating through each timeslot, aggregate the timeslot scores to determine an aggregated score for the user schedule. The timeslot scoring logic 164 may then determine an aggregate score across users to determine an optimal schedule arrangement for a set of users (e.g., all users in a team, all users in a company, etc.).

The rescheduling logic 166 may be configured to determine one or more rescheduling moves for scheduled meetings within the sets of timeslots in the user schedules. A rescheduling move represents a potential rescheduling of a meeting based upon user participant schedules, meeting preferences for the user participants, and meeting constraints for the meeting. In an embodiment, the rescheduling logic 166 may access one or more rescheduling rules and the meeting preferences to determine one or more rescheduling moves to apply to user schedules. Upon determining the one or more rescheduling moves, the rescheduling logic 166 may request the timeslot scoring logic to recalculate aggregated timeslot scores that reflect updated scores that account for the rescheduling moves if applied to the user schedules. In an embodiment, the rescheduling logic 166 uses the updated scores to determine whether the rescheduling moves would increase the optimized scores for one or more of the users. In one embodiment, the rescheduling logic determines whether the aggregate score across a set of users increases as a result of the rescheduling moves. If the optimized scores for the one or more of the users increase (e.g., if the aggregate score across the set of users increases), then the rescheduling logic 166 may generate one or more meeting updates to reflect meeting changes based upon the rescheduling moves. If however, the optimized scores do not increase (e.g., if the aggregate score across the set of users decreases), then the rescheduling moves may not be applied.

In an embodiment, the rescheduling logic 166 may be configured to iteratively apply rescheduling rules to determine multiple sets of rescheduling moves. For instance, if in a previous rescheduling round, the rescheduling logic 166 determined a first set of rescheduling moves, then the rescheduling logic 166 may in a subsequent round apply a different set of rescheduling rules to generate a second set of rescheduling moves that may further optimize the meeting schedules in addition to the first set of rescheduling moves. In another embodiment, if the first set of rescheduling moves does not further optimize the meeting schedules, then the rescheduling logic 166 may apply a different set of rescheduling rules to generate a new set of rescheduling moves even if the first set of rescheduling rules are not used to optimize the user schedules. Many different possible combinations of the same and/or different rescheduling rules may be applied in sequence, for example. In an embodiment, the rescheduling logic 166 may perform several rescheduling rounds applying the same and/or different rescheduling rules during different rounds until a threshold level of optimization is met. The threshold level of optimization may represent a desired level of meeting schedule optimization for a majority of users based upon the applied scoring metrics.

Figure 2A:
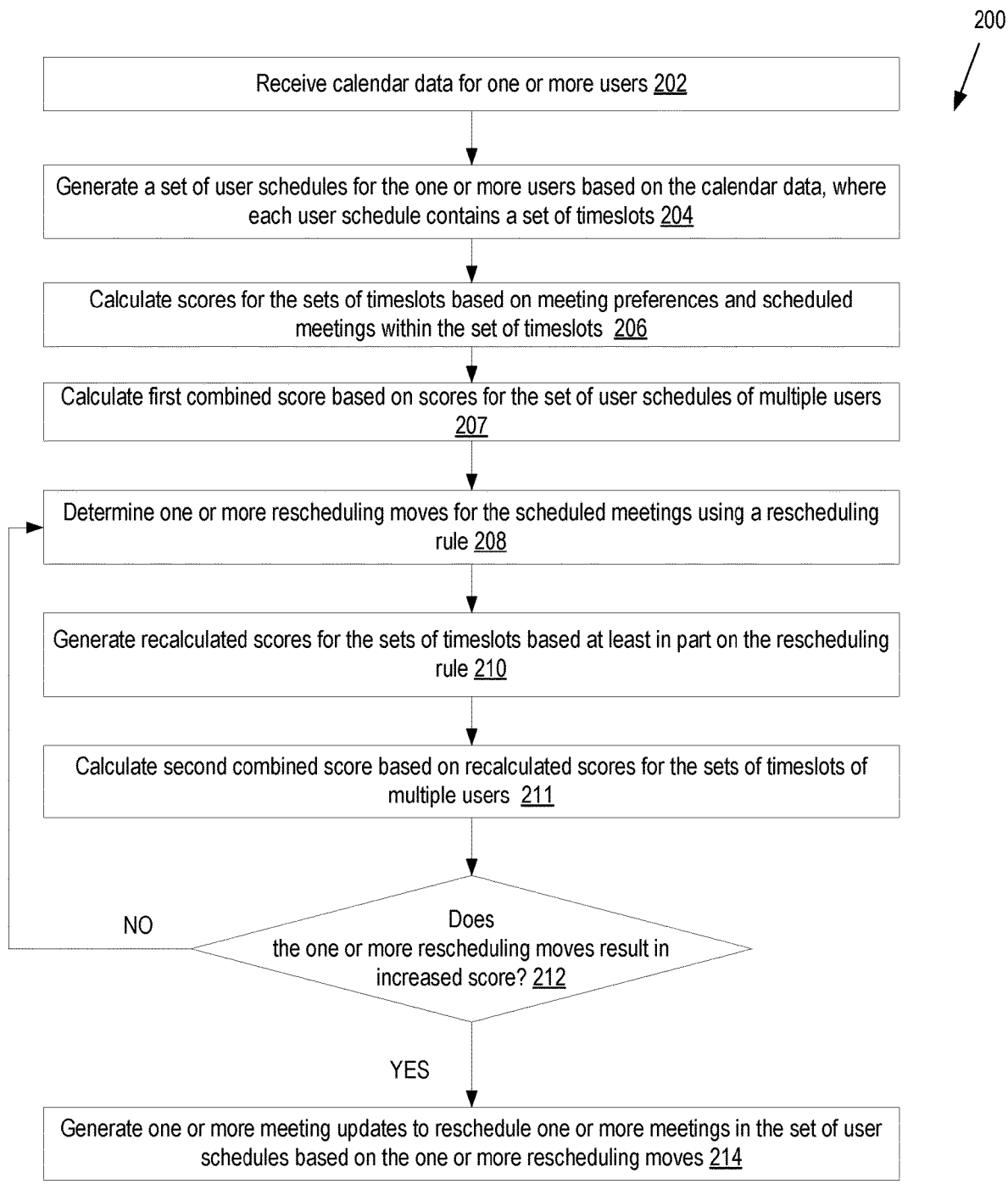
FIG. 2A is a flow diagram illustrating one embodiment of a method for optimizing user meeting schedules for users based upon meeting scheduling preferences of the users.
Figure 2B:
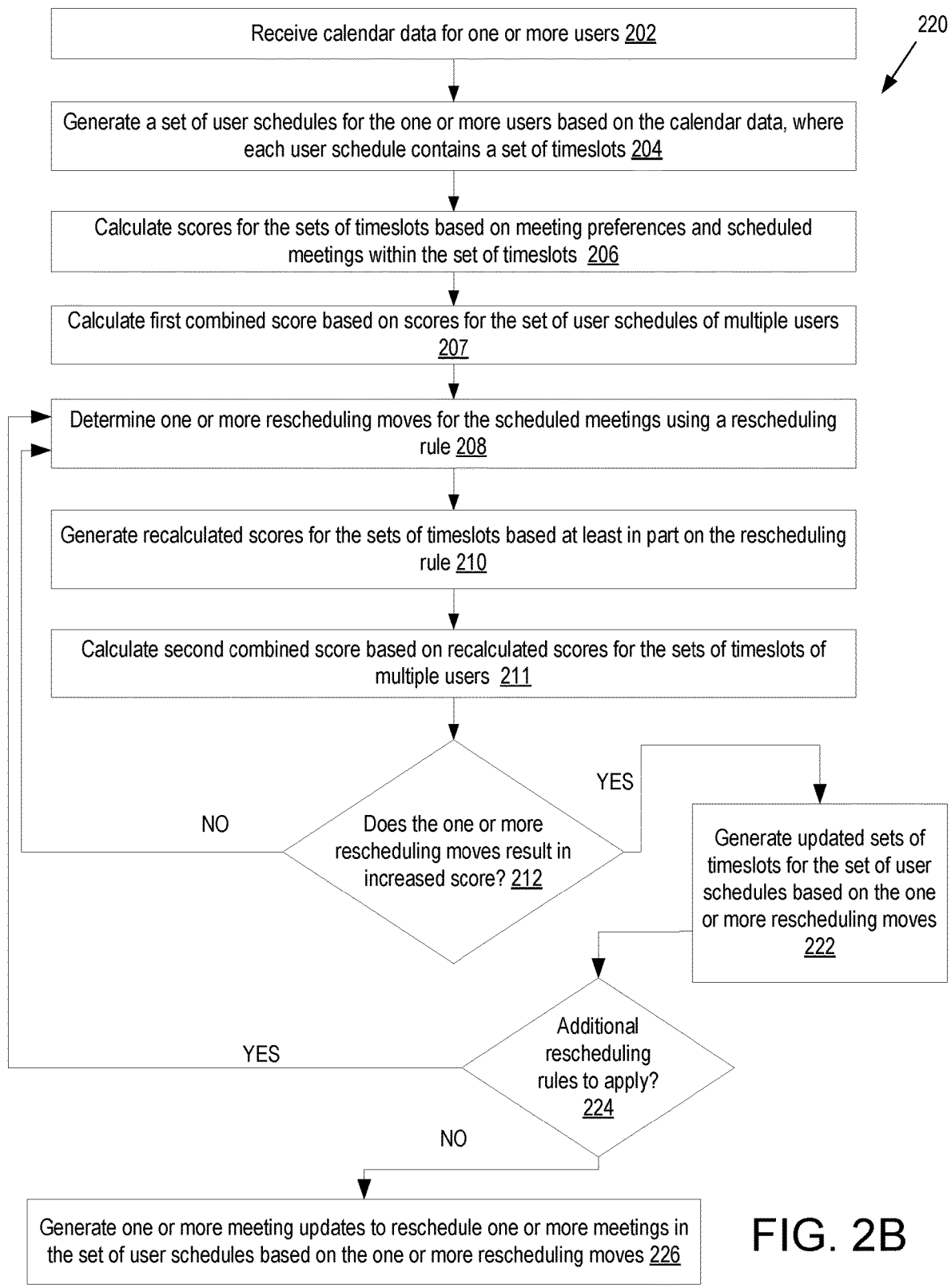
FIG. 2B is a flow diagram illustrating another embodiment of a method for optimizing user meeting schedules for users based upon meeting scheduling preferences and multiple rescheduling rules.

FIGS. 2A-2B are flow diagrams illustrating various methods for receiving calendar data for users and optimizing user meeting schedules by generating one or more meeting updates to reschedule one or more meetings for users. The methods may be performed by processing logic that comprises hardware (e.g., circuitry, dedicated logic, programmable logic, microcode, etc.), software (e.g., instructions run on a processor), firmware, or a combination thereof. The methods may be performed, for example by the server computing device 150 of FIG. 1 in embodiments.

FIG. 2A is a flow diagram illustrating one embodiment of a method 200 for optimizing user meeting schedules for users based upon meeting preferences of the users. At block 202 of method 200, processing logic receives calendar data for one or more users. The calendar data may be received in response to one or more users generating accounts with schedule optimization service 160. In generation of an account with the schedule optimization service 160, a user may grant the schedule optimization service 160 access to work calendars of an individual or team of individuals. The work calendars may be maintained by calendar server computing device 120 in embodiments. The calendar data may be received from the calendar server computing device 120. The calendar data may include meeting schedules for the one or more users, including information about each of the meeting events scheduled, such as a meeting ID, a meeting description, meeting date, time, location of the meeting, and the current invitees for the meeting. Meeting events may also include user-specific notes generated by specific users. For example, user A may have inserted a local note specifying materials to bring for the 9 AM meeting event. The calendar data received may cover a particular period of time such as a week, month, or year, or any other specified period.

In an embodiment, processing logic may also receive user metadata describing the one or more users and their relationships with one another. For example, the user metadata may include an organization chart or hierarchy describing the teams and/or departments containing the one or more users. The user metadata may be used to determine relationships between users for the purpose to rescheduling meetings involving related users and for associating various meeting preferences to related users. For example, meeting preferences associated with user A may also be associated with other users who belong to the same team as user A. In an embodiment, user metadata may be received as part of the calendar data. In other embodiments, user metadata may be received separate from the calendar data or may be queried directly from the calendar server computing system 120 or another source such as rules repository 180.

In an embodiment, processing logic may receive user metadata that includes location information for users. Location information may include, but is not limited to, users work location and geo-location information related to users during the workday and for their scheduled meetings. Geo-location information may be used to determine potential travel times to meeting locations and in between meetings. Additionally, location information may specify whether users remotely connect to meetings for the purpose of determining user schedules and compatible meeting rooms.

In an embodiment, processing logic may receive meeting preference data that may include constraints for meeting events. For example, a meeting organizer may specify scheduling constraints which may include whether a scheduled time for a meeting is flexible. If so, then the meeting preference data may include a time range of one or more scheduling times for the meeting event. Processing logic may use the time range for the meeting event to determine potential rescheduling moves for the meeting event. Additionally, meeting preference data for meeting events may include preferences on alternate meeting locations, such as alternate rooms, for a meeting. This preference data may be useful when rescheduling a meeting event where the currently assigned room is occupied during a potential rescheduling time.

At block 204, processing logic generates a set of user schedules for the one or more users based upon the calendar data. The received calendar data may be used to generate sets of meeting events for each user. For example, user A may have a set of meeting events describing each meeting that user A is scheduled to attend for the week and user B may have a separate set of meeting events that user B is scheduled to attend.

In an embodiment, a set of users for which user schedules are to be generated is determined by extracting users from the calendar data including meeting participants that may not have been explicitly set within the calendar data. For example, the calendar data may have included meeting events associated with users A and B, who may have accounts with the schedule optimization service 160, but participant lists for the meeting events may also include other users such as user X and Y, who may not have accounts with the schedule optimization service 160. The set of users may include each of the meeting participants from the meeting events, which may include users A, B, X, and Y.

Meeting events may be generated from the calendar data for the purpose of tracking each distinct meeting that the set of users have scheduled. Meeting events may also include personal appointments or other meetings associated with users' personal calendars. Processing logic may be configured to access users' personal calendars, upon authorization, to determine potential timeslots that have scheduled personal appointments. In an embodiment, processing logic may perform deduplication on the meeting events within the calendar data. The received calendar data from the calendar server computing device 120 may be formatted from the perspective of each user, where each user has a copy of each meeting event that they are scheduled to attend. As a result, the calendar may include duplicate copies of meeting events for each meeting participant. The processing logic may deduplicate the copies of meeting events to store and manage a single copy of a meeting event. For example, processing logic may download individual calendars of multiple users, and may deduplicate the multiple calendars to generate an efficient team-view of the calendar by deduping calendar events across user calendars. This may greatly reduce storage and computation costs. Each meeting event may be referenced using a unique meeting event identifier (ID). Deduplication techniques implemented may include any number of deduplication techniques known in the art.

Copies of meeting events from the calendar data may include customized information, such as inserted notes, that are specific to a user. In an embodiment, processing logic may generate versioned copies of the deduplicated meeting events to include any customized information specific to a user. By doing so, any user-specific information may be preserved within a version of the meeting event. A versioned copy of an event may be a snapshot of the event that includes a reference to a master copy of the event and a delta from the master copy. Accordingly, the versioned copy may consume a minimal amount of storage resources.

User schedules for each of the identified users may include a set of timeslots that represent a specific time window. The timeslots may be used to track whether a user's time is booked for a meeting event or whether the time is free. If a timeslot is booked, then the timeslot may contain a reference, such as a pointer, to the specific meeting event scheduled during that timeslot. In an embodiment, processing logic may generate a set of user schedules that each contains a set of timeslots for each user.

Figure 5A:
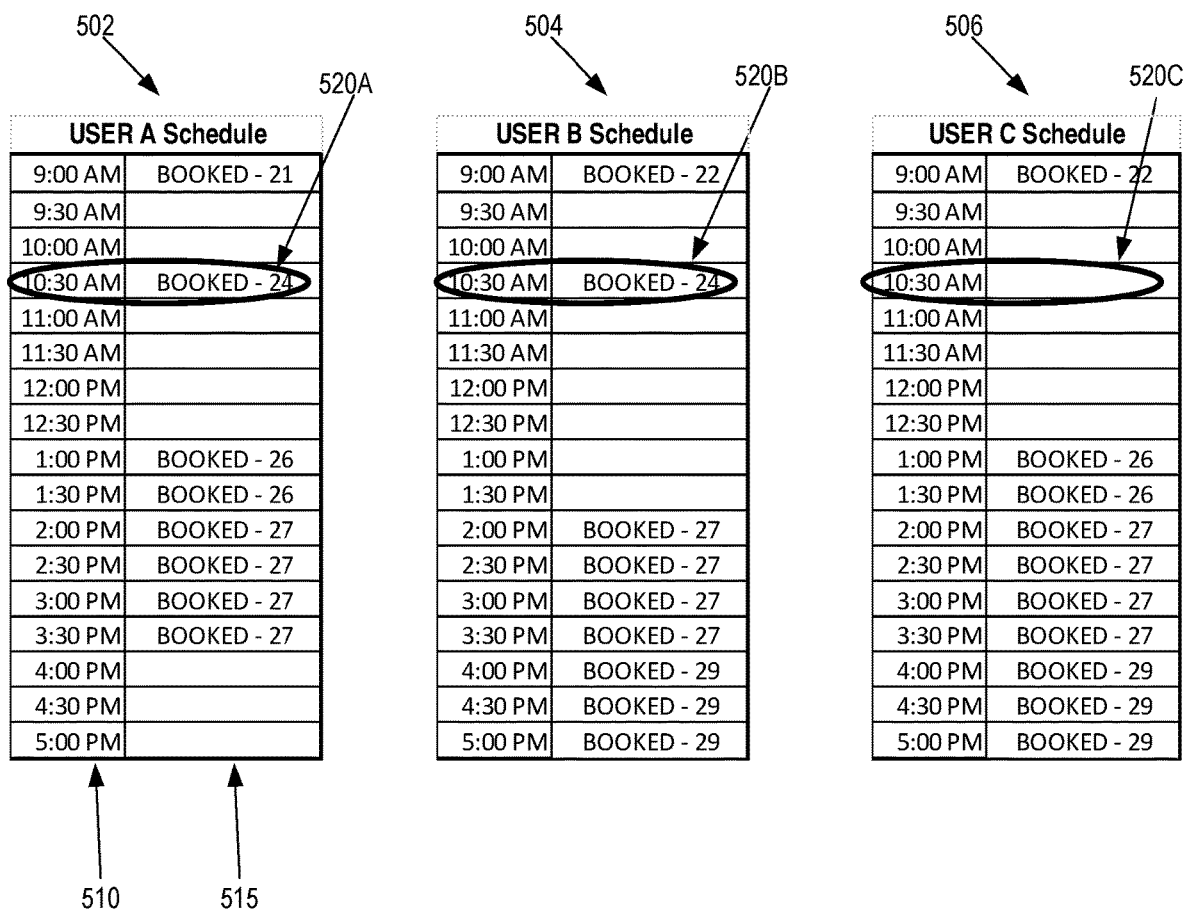
FIG. 5A illustrates an example diagram of generated user schedules for users for a given workday.

FIG. 5A represents an example diagram of generated user schedules for users A-C for a given workday. User schedules 502, 504, and 506 represent illustrations of a user schedules for users A-C respectively. Each of the user schedules 502, 504, and 506 contains a set of timeslots for the given day. User schedules 502, 504, and 506 represent one example of set of timeslots. Other examples of user schedules may span longer durations such as a week or any other duration. Column 510 represents time windows for each of the timeslots within user schedule 502. Each timeslot illustrated represents a 30 minute time window within the workday. Other embodiments of timeslots may include longer or shorter time windows. Column 515 represents the occupancy status for each time window. The occupancy status may also include a reference to the meeting event scheduled during the time window. For example, timeslot 520A represents a time window starting at 10:30 AM for user A and shows timeslot 520A as occupied with a meeting. Timeslot 520A may also include the unique meeting ID (24) for the meeting event scheduled during timeslot 520A. Timeslot 520B represents time window starting at 10:30 AM for user B and shows timeslot 520B as occupied with a meeting. If user A and user B are scheduled for the same meeting at 10:30 AM, the timeslots 520A and 520B may contain the same meeting ID (24). Timeslot 520C, which represents time window starting at 10:30 AM for user C shows that timeslot 520C is not occupied with a meeting event and is free.

User schedule meeting optimization may be based upon meeting preferences of the users. In an embodiment, processing logic may receive meeting preference data that may include preferences and/or constraints for users. User related meeting preference data may include data specifying times within a workday that a particular user is typically available for a meeting. For example, the meeting preference data may specify that user A is typically available for meetings between 9 AM and 5 PM, whereas user B is typically available for meetings between 7 AM and 4 PM. In an embodiment, processing logic may be configured to infer available meeting times for other users not included in the received meeting preference data by assigning default availability times based upon the availability times of users that are within the same organization. In other embodiments, processing logic may infer availability times for other users based upon meeting scheduling history of other users. For example, if a user X historically has meetings scheduled between 8 AM and 5 PM then processing logic may infer that user X is available for meetings between 8 AM and 5 PM.

In an embodiment, meeting preference data may include user specific preferences that describe how users prefer to optimize their user schedules. For instance, each user may have a preference on how to structure their day and when to schedule meetings. Meeting preferences for a user may include, but are not limited to, whether the user prefers meetings in the mornings or in the afternoons, whether the user values blocks of time free of meetings in order to focus on project work, herein referred to as "focus time", the amount of focus time that a user prefers, specific times free of meetings for lunch or other reoccurring events, a preference on the number of back-to-back meetings scheduled, and so on. For example, user A may prefer not to have more than three hours of meetings back-to-back or user A may prefer to have 15 minutes free after each meeting in order to write down notes from the previous meeting.

In an embodiment, processing logic may be configured to represent focus time as a dynamic meeting or other placeholder that represents a block of time important to a user. Dynamic meetings may represent a specific period of time that is important to a user, such as focus time or any other defined preference, and may be structured around available time not already scheduled for a meeting. For instance, dynamic meetings may have self-adjusting start and end times based upon surrounding meetings. If a user has 2 hours free in the morning, then processing logic may label the 2-hour window as focus time. If during rescheduling the 2-hour window increases to 3 hours then the dynamic meeting for focus time may automatically adjust to incorporate the additional free hour.

In an embodiment, user specific preferences may also include meeting preference related to a user's geo-location, time zone, and personal schedule. User's geo-location may represent historical geo-locations of the user. For example, if a user is a remote employee, then processing logic may not need to account for travel time when rescheduling meetings for the user. If however, the user typically resides in a remote office, then the user's geo-location may be taken into account when scheduling meeting occurring at a location that is different than the user's location. A user's personal schedule may include preferences that account for time set aside for lunch breaks, work out schedules, or any other personal time.

In an embodiment, processing logic may receive meeting preferences for users from the calendar server computing device 120, computing devices 101A-Z, or any other external computing device. In another embodiment, the processing logic may be configured to determine meeting preferences for users that do not provide meeting preferences by inferring preferences for users based upon their relationships with other users and/or their prior meeting schedule history.

Inferring meeting preferences may include determining a user's meeting preference based upon the preferences of other users within the same team/department or from other users that attend the same types of meetings. For example, user Z may work on the same team as user A or may at least attend the same meetings as user A and as a result, the processing device may infer that user Z may prefer the same type of meeting preferences as user A. In some embodiments, inferring meeting preferences for a user may be limited to certain types of preferences, such as blocks of time free of meetings.

In an embodiment, default meeting preferences may be associated with one or more users. For example, for users that are engineers may have a default meeting preference for focus time that may be associated with all users that are engineers.

Referring back to FIG. 2A, at block 206 processing logic may calculate scores for the sets of timeslots for user schedules based upon meeting preferences of the users. In an embodiment, processing logic may assign scoring metrics to each of the meeting preferences in order to determine scores for each of the sets of timeslots. Scoring metrics associated with a meeting preference may be used to assign a numerical value to timeslots based on whether the timeslot satisfies the meeting preference. Numerical values may be simple binary values such as a 0 or 1 assigned to a timeslot based on whether or not there is a meeting scheduled, or may be more complex numerical values assigned based upon for example the number of consecutive timeslots that have meetings. Scores may be generated for each of the user preferences, and a combined user score may be determined based on the scores associated with each of the user preferences.

In an embodiment, processing logic may iterate through the set of users and calculate an optimization score for each of the users. Processing logic may then combine the scores for each of the users to generate a first total combined score based on scores for the sets of timeslots for multiple users at block 207.

For large organizations that may include large sets of users, it may be computationally inefficient to generate a first total combined score based upon each user within the large organization. In an embodiment, processing logic may be configured to create user groups that represent subsets of users of the large organization. Processing logic may determine each user group based upon meeting schedule similarity and overlaps between users and/or determined organizational relationships between users. For example, user A and user B may be associated with the same user group if they participate in many of the same meetings as this may be an indicator that both user A and user B are part of the same project or team. Processing logic may, at block 207, generate a first total combined score for a specific user group based on scores for the sets of timeslots of users that are within the specific user group. Each user group for the large organization may then be separately optimized based upon the users within each user group.

Figure 3:
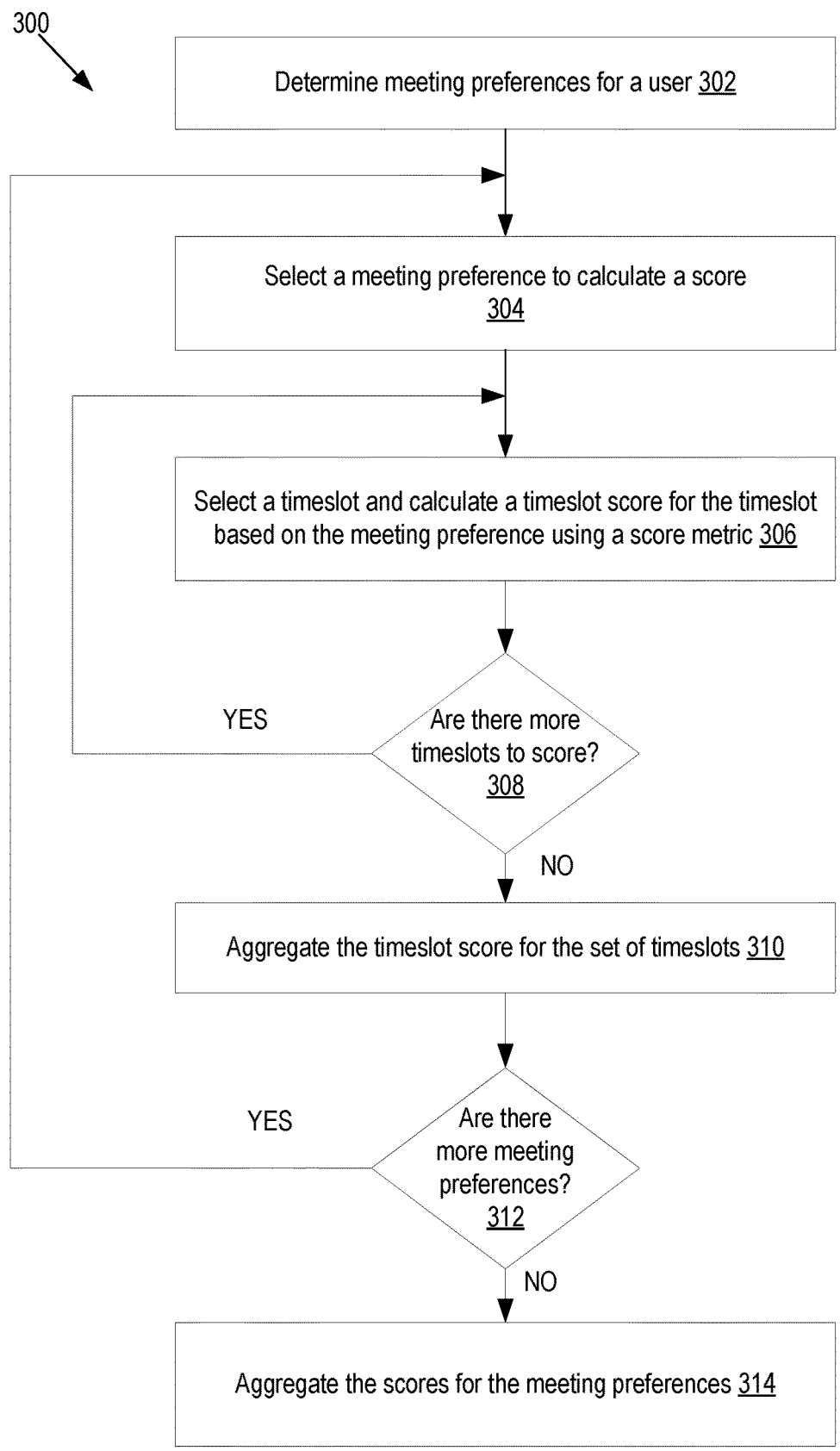
FIG. 3 is a flow diagram illustrating a method for calculating an optimization score for a user.

FIG. 3 is a flow diagram illustrating a method 300 for calculating an optimization score for a user. At block 302 of method 300, processing logic determines the meeting preferences associated with a particular user. If the particular user is user A, then the processing logic may retrieve from the rule repository 180 the meeting preferences associated with user A. For example, user A may have preferences that include focus time, having mornings free of meetings, and a preference not to have three hours of meetings, herein referred to as meeting fatigue.

After determining the meeting preferences associated with the particular user, processing logic is configured to generate a meeting preference score for each meeting preference. At block 304, processing logic selects a meeting preference to score from the meeting preferences associated with the particular user. For example, the focus time meeting preference may be selected. In an embodiment, a score metric may be associated with the current meeting preference. In the case of the focus time meeting preference, focus time may require at least two hours free of meetings so that a user may focus on other tasks. The scoring metric may then award a point to each timeslot within a chunk of timeslots that are free of meetings and are greater than or equal to two hours.

Figure 5B:
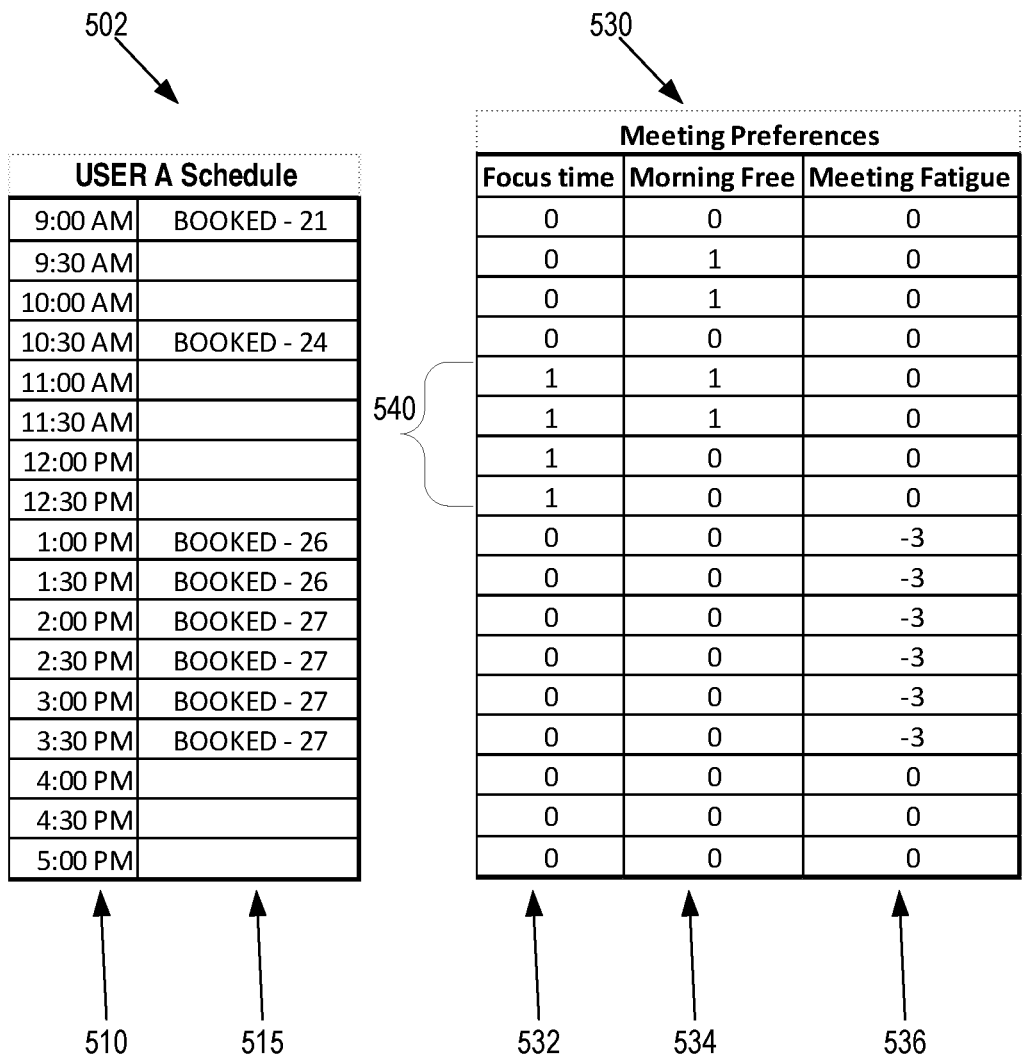
FIG. 5B illustrates an example scoring matrix for a user schedule associated with a user.

At block 306, processing logic selects a timeslot and calculates a timeslot score for the meeting preference based upon the associated scoring metric. FIG. 5B illustrates an example scoring matrix for the user schedule associated with user A. Table 530 illustrates the current meeting preferences associated with user A as focus time, mornings free, and meeting fatigue. Referring to block 306, processing logic may select a timeslot, such as 9:00 AM and calculate a timeslot score based on the current meeting preference of focus time. As described, the focus time meeting preference may award a point for each timeslot that is within a 2-hour or more block of free time. In the current example, timeslot 9:00 AM is currently booked for a meeting. Therefore zero points may be assigned to the 9:00 AM timeslot. In another example, timeslot 11:00 AM is free of a meeting and is within a 2-hour block of free time. Timeslot 11:00 AM may be assigned a point based on the free time scoring metric.

Referring back to FIG. 3, at decision diamond 308, processing logic determines whether there are any more timeslots to score within the current user's user schedule. If there are no more timeslots within the user schedule then the process proceeds to block 310 to generate an aggregate score of the timeslots for the current meeting preference. If however, there are more timeslots to score, then the process proceeds back to block 306 to select the next timeslot to score.

Referring back to the previous example, after scoring timeslot 9:00 AM, processing logic would determine at decision diamond 308 that additional timeslots need to be scored and would proceed to block 306. At block 306, timeslot 9:30 AM would be selected and a score would be calculated for the current meeting preference of focus time. In order to be awarded a point for focus time, the current timeslot would need to be part of a 2-hour or more block of free time. In an embodiment, processing logic may look at preceding and subsequent timeslots to determine whether the current timeslot is within a 2-hour or more block of free time. The timeslot that immediately precedes the current 9:30 AM timeslot is the 9:00 AM, which contains a scheduled meeting. Therefore processing logic may look at the subsequent timeslots to determine whether a 2-hour block of free time exists. Timeslots 9:30 AM and 10:00 AM are free but timeslot 10:30 AM is occupied, therefore the current timeslot of 9:30 AM is not within a free block of focus time and is assigned a point value of zero. Processing logic would proceed to decision diamond 308 and determine whether additional timeslots are to be scored.

Referring back to FIG. 5B, scores 540 illustrate instances where the processing logic determined a 2-hour block of free time for timeslots referring to 11:00 AM through 12:30 PM. As a result, processing logic assigned a point to each timeslot within the 2-hour time window. The 2-hour block of free time is an example duration for the block free time. Processing logic may be configured to use other durations for the block of time, such as 1-hour, 3-hour, 30 minute, or any other configurable block of time. In an implementation, processing logic may use a user-defined duration for the block of free time.

As described, processing logic iterates through each timeslot for the user schedule. If the end of the set of timeslots is reached, then processing logic proceeds from decision diamond 308 to block 310 to aggregate the timeslot scores for the set of timeslots with reference to a particular user preference. Referring to FIG. 5B as an example, focus time column 532 would be aggregated to generate a sum meeting preference score for focus time. In the current example the meeting preference score would equal 4 as there is only one 2-hour window of free time that received positive scores.

Returning to FIG. 3, at decision diamond 312, processing logic determines whether there are additional meeting preferences to score for the current user. If there are no more additional meeting preferences, then processing logic proceeds to block 314 to generate a user schedule score as an aggregate of the meeting preference scores calculated. If, however, there are additional meeting preferences to score, then processing logic proceeds to block 304 to select the next meeting preference to score.

Referring to the example in FIG. 5B, processing logic would proceed to block 304 and select the next meeting preference as mornings free. Processing logic would then proceed to blocks 304-310 to score each timeslot based upon the scoring metrics assigned to mornings free. For example, the mornings free preference may assign a point to each timeslot in the morning that is free of meetings. Mornings free column 534 represents the scores assigned to each timeslot.

In another example illustrated in FIG. 5B, at block 304 processing logic may select the meeting preference of meeting fatigue. The meeting fatigue preference and associated scoring metrics may assign negative points for blocks of meetings exceeding a threshold. For example, user A may have specified a threshold of no more than three consecutive timeslots with meetings. In an embodiment, processing logic may use a formula such as max(# blocks−threshold, 0) to determine the penalty score, where the threshold value represents the maximum number of consecutive timeslots containing a meeting. In one example the threshold may be set to 3 to represent that the user prefers a maximum of 3 consecutive timeslots with meetings. Timeslots 1:00 PM through 3:30 PM contains meetings, which equals 6 consecutive timeslots. Therefore the formula would calculate a value of 3, which is greater than 0 and would be assigned as the penalty value for each of the six timeslots between 1:00 PM and 3:30 PM. Meeting fatigue column 536 shows "−3" values assigned to the six timeslots. The values may be assigned as negative values to represent a penalty.

In an embodiment, the threshold value for meeting fatigue for a user may be configured based upon historical meeting patterns. For example, if a user historically only has 1-2 hours of consecutive scheduled meetings, then the threshold value may be set at 4 timeslots, where each timeslot is a 30 minute interval. Others users who routinely have 3-4 hours of back-to-back meetings may have a configured threshold value for meeting fatigue at 8 timeslots.

Referring back to FIG. 3, at block 314 processing logic may aggregate the meeting preference scores for a particular user to determine an optimization score for the user schedule associated with that user. In an embodiment, processing logic may assign different weights to each of the meeting preference scores. Weights may be assigned based upon priorities given to each meeting preference. For example, if user A values focus time over morning free time and meeting fatigue, then the focus time preference score may be given a larger weight than the mornings free preference score and the meeting fatigue preference scores.

In an embodiment, score weights may be specified by users or may be derived based upon the teams, departments, or other configured optimization criteria specifying which preferences are more important. Processing logic may evaluate historical user schedules to determine meeting patterns that show preferences of a specific meeting preference over another. For instance, historical user schedules may show that user A historically has had their mornings free of meetings more often than having large chunks of focus time and based upon this historical data, processing logic may assign more weight to the mornings free preference than the focus time preference.

In another embodiment, score weights may be dynamically updated based upon whether a user schedule satisfies or is close to satisfying a specific meeting preference. If a meeting preference is satisfied or is close to being satisfied, then processing logic may lower the priority of the meeting preference by lowering the score weight assigned to the meeting preference. For example, if a user prioritizes focus time and the user schedule indicates that the user currently has 30 hours of focus time for the week, then the processing logic may lower the score weight for the focus time so that other meeting preferences may be satisfied. Determining whether a meeting preference is satisfied may be based on explicit user information or may be inferred using historical user schedule information for user A or users related to user A.

Referring back to FIG. 2A, processing logic, at block 207, calculates a first combined score for the sets of user schedules based upon the optimization scores calculated for the sets of timeslots for each user. In an embodiment, processing logic may be configured to assign user-specific weights to optimization scores for the purpose of allowing optimization scores for particular users to have either greater of lesser weight than other users. For example, a user that is a CEO may have a greater weight assigned to their optimization score because optimizing the CEO's user schedule may be more important than optimizing other users. In another example, an optimization score for a project manager may be given lesser weight that the optimization scores of engineers as the project manager may want to ensure that the engineers' schedules are optimized for efficiency over the project manager's schedule.

After a first combined score has been generated, one or more rescheduling moves may be determined. Referring to FIG. 2A, at block 208 processing logic determines one or more rescheduling moves for the scheduled meetings within the set of user schedules using a rescheduling rule. In an embodiment, processing logic selects a rescheduling rule to determine one or more rescheduling moves. Rules repository 180 may contain one or more rescheduling rules. Rescheduling rules may include, but are not limited to a narrow gap mover strategy that determines small gaps of free time for which meetings may be moved into in order to fill the free gaps, a back-to-back strategy to move shorter meetings together, a swap meetings strategy that tries to swap meetings in order to improve overall meeting optimization, an organizational move strategy that moves meetings for participants of the same team to a time where the team meetings are together, a clear out strategy that intends to create as much focus time for user as possible, and a random mover strategy that randomly moves meetings in order to optimize meeting schedules.

Figure 4:
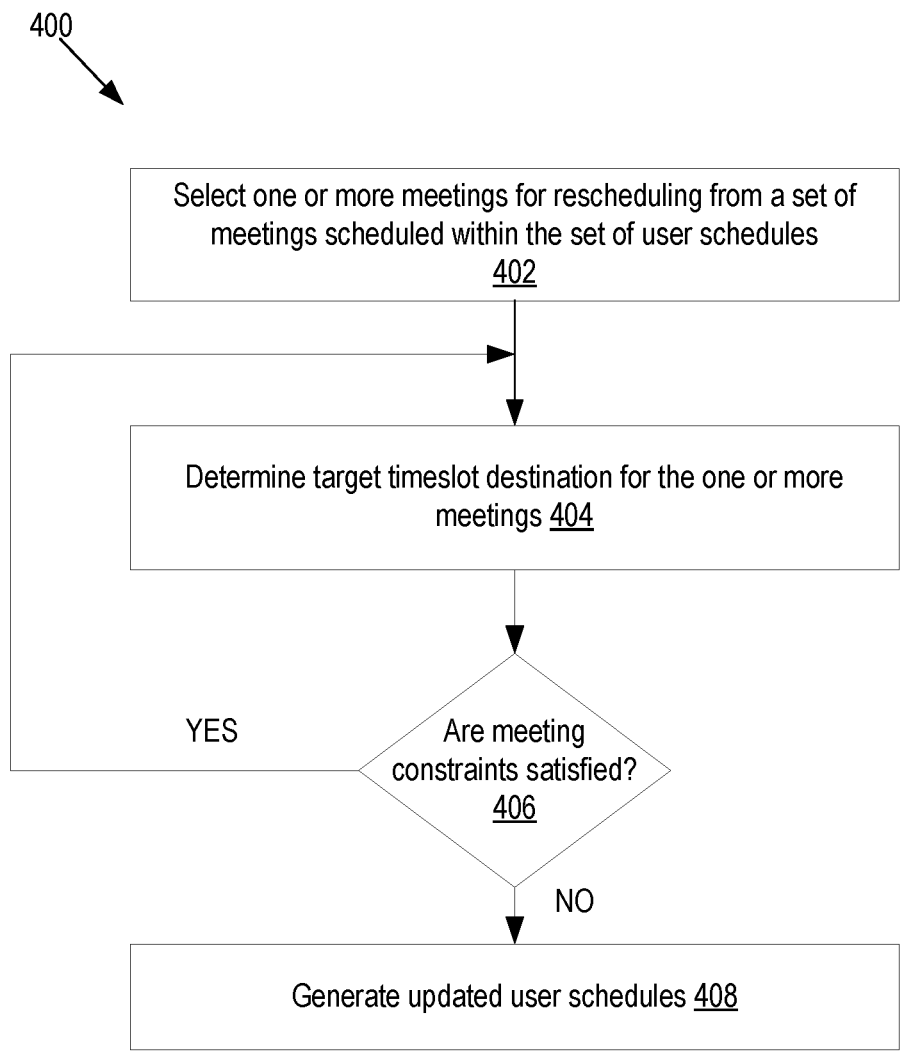
FIG. 4 is a flow diagram illustrating a method for determining one or more rescheduling moves based on a selected rescheduling rule.

FIG. 4 is a flow diagram illustrating a method for determining one or more rescheduling moves based on a selected rescheduling rule. At block 402, processing logic selects one or more meetings for rescheduling from a set of meetings scheduled within the set of user schedules. The one or more selected meetings may be based upon the meeting preferences of users and the scoring metrics used to determine the optimization score. For example, if the meeting preferences are weighted such that the mornings free and focus time preferences are prioritized, then the one or more meetings selected may be meetings that are inconvenient for the mornings free and focus time preferences. In an embodiment, processing logic may determine an inconvenience score for each meeting from the user schedules as a function of the highest potential optimization score for a timeslot minus the current score for the timeslot.

For example referring to FIG. 5B, user schedule 502 has meetings scheduled for 9:00 AM, 10:30 AM, and 1:00 PM. Processing logic may be configured to determine the highest potential optimization score as the score that satisfies each of the meeting preferences 530. For meetings 9:00 AM, 10:30 AM, and 1:00 PM the highest potential optimization score may be calculated as a sum of the scores of each meeting preference score as:

| | Focus Time | Mornings Free | Meeting Fatigue | Potential Optimization score |
|---|---|---|---|---|
| 9:00 AM | 1 | 1 | 0 | 2 |
| 10:30 AM | 1 | 1 | 0 | 2 |
| 1:00 PM | 1 | 0 | 0 | 1 | where 9:00 AM and 10:30 AM would have the highest potential optimization score as these timeslots would potentially satisfy each of the meeting preferences. Processing logic may calculate inconvenience scores as the potential optimization score for a timeslot minus the current optimization score for the timeslot. Referring to meeting preferences 530, the current optimization scores for 9:00 AM, 10:30 AM, and 1:00 PM are (0, 0, −3) respectively. The inconvenience score for each timeslot for user schedule 502 may then be calculated as:

| | Potential Optimization score | Current Optimization score | Inconvenience Score |
|---|---|---|---|
| 9:00 AM | 2 | 0 | 2 |
| 10:30 AM | 2 | 0 | 2 |
| 1:00 PM | 1 | −3 | 1 | where 9:00 AM and 10:30 AM are the most inconvenient for user schedule 502. In an embodiment, meeting preferences that calculate negative values may be treated as zero scores. In other embodiments optimization scores may be normalized or weighted prior to calculating the inconvenience scores.

In an embodiment, inconvenience scores for each meeting are calculated as the sum of the timeslot inconvenience scores for each user participating in that particular meeting. For instance the meeting event at 9:00 AM includes users A, B, C and therefore the inconvenience score is calculated as the sum of the inconvenience scores of users A, B, C.

Whereas the meeting event at 10:30 AM only includes users A and B and the inconvenience score for meeting event 10:30 AM is calculated as the sum of the inconvenience scores of users A and B.

In an embodiment, inconvenience scores for meetings that span multiple timeslots may be based on an average inconvenience score for each timeslot that includes the longer meeting. In other embodiments, meetings that span several timeslots, such as all-day meetings or several hour meetings may automatically be deprioritized based upon the difficulty of rescheduling meetings that have a long duration.

Different rescheduling rules may cause selection of different meetings to be rescheduled. In an embodiment, a particular rescheduling rule may be configured to analyze and determine meeting events that that are double booked based on the meeting location. For example, two or more meeting events may be scheduled for a particular conference at the same time. This may occur if the calendar service does not check meeting room availability prior to generating a meeting event. The particular rescheduling rule may then select the one or more meetings for rescheduling based on the double booked meetings.

In other embodiments, different rescheduling rules may cause selection of different meetings to be rescheduled. For example, the random mover strategy, which randomly moves meetings in order to optimize meeting schedules, may randomly select one or more meetings for rescheduling.

Referring back to FIG. 4, at block 402 processing logic selects the one or more meetings that have the highest inconvenience score. At block 404, processing logic determines target timeslot destinations for the one or more meetings selected for rescheduling. Target timeslot destinations may be determined based upon the rescheduling rule selected. For example, rescheduling rules that are based upon strategies to move meetings to timeslots that are currently free may evaluate target timeslot destinations based upon a potential inconvenience that would be incurred if a meeting was moved to a target destination. In an embodiment, processing logic may calculate potential inconvenience scores for each open timeslot to determine target timeslots that incur the least amount of inconvenience. The potential inconvenience scores may be calculated as a difference in the current optimization score of a timeslot and the potential optimization score if the meeting were to be moved to the target timeslot. For example referring to user schedule 502, if a ½ hour long meeting is to be rescheduled, processing logic may evaluate open timeslots 9:30, 10:00, and 11:00 AM as potential target timeslots. Currently, optimization scores for 9:30 and 10:00 AM are each 1, where each point comes from the mornings free preference. The optimization score for 11:00 AM is currently 2, where one point is for mornings free and the other point is for focus time. If the meeting were moved to either 9:30 AM or 10:00 AM the potential optimization score would drop to zero, and the potential inconvenience scores for 9:30 AM and 10:00 AM would be 1 ((current optimization score=1)−(potential optimization score=0)). For timeslot 11:00 AM, the potential optimization score would drop to 0 because the focus time score and the mornings free score would be nullified; therefore the potential inconvenience score for 11:00 AM would equal 2 ((current optimization score=2)−(potential optimization score=0)). Processing logic may then sort the potential inconvenience scores to determine the least inconvenient timeslots, which in this example may be either 9:30 AM or 10:00 AM. Potential inconvenience scores for each user schedule of the user participants for the meeting to be rescheduled may be aggregated to determine an overall potential inconvenience score for each of the target timeslots.

In an embodiment, processing logic may, when calculating inconvenience scores, evaluate adjacent timeslots to determine any further inconvenience of rescheduling a meeting to a target timeslot. In the example of 11:00 AM, optimization scores for timeslots 11:30-12:30 PM would also be reduced since the focus time condition of having 2 hours free would not be met.

In an embodiment, a meeting event may have associated meeting time and/or location constraints that may be used to determine target timeslot destinations for rescheduling meetings. For example, a particular meeting event may define a time range as being Monday-Wednesday from 8 AM to 1 PM. This may be based upon the availability of user participants or specified constraints supplied by the meeting organizer. The processing logic may then use the defined time range as a constraint when determining initial target timeslot destinations. In another example, a particular meeting may require specific equipment only available in specific conference rooms or may require only a specific minimum capacity of a conference room. As a result, the meeting event may include these meeting constraints, defined by the meeting organizer, and may include a set of potential meetings rooms that satisfy the meeting location constraints. The provided set of potential meeting rooms may be used to determine potential target timeslot destinations based upon availability of one of the set the meeting rooms specified.

In an embodiment, processing logic may be configured to identify "hotspot" timeslots within the user schedules. A hotspot timeslot may represent an open timeslot that either comes before or after a large meeting such as a department meeting or all-hands meeting. These timeslots may be identified as good targets for rescheduling meetings because user participants of the large meetings may likely be available for another meeting without having any focus time disrupted.

In an embodiment, if a rescheduling rule based upon swapping meetings is used, then inconvenience scores may be based upon potential optimization scores for timeslots swapped. In other embodiments, potential inconvenience scores for target timeslots may be customized to match the rescheduling rule strategy used.

In an embodiment, meeting constraints for meeting events may include flexible constraints that may allow changes to the meeting event. For example, a 2-hour meeting event may have a description from the organizer stating that the meeting may only need to be 1.5 hours. The processing device may be able to reschedule the 2-hour meeting event into a 1.5 hour time window if needed. Flexible constraints may also be applied to other types of constraints such as participant availability during a work way. For example, participants may have individual constraints that ensure that meetings are scheduled during regular work hours. However, meetings that have multiple participants are located in different time zones may need work hour constraints to be flexible in order to schedule the meetings. Processing logic may be configured to determine a meeting time that is suitable for participants in multiple time zones, which may require participant work hour constraints to be flexible.

In an embodiment, processing logic may determine relevant participants for meetings. For example, a recurring meeting may include 10 participants but only 7 of the 10 participants attend the meeting on a regular basis. When determining target timeslots, processing logic may focus on the participants that normally attend the meeting rather than trying to accommodate meeting schedules of participants who do not regularly attend.

In an embodiment, when determining target timeslots for meeting events, processing logic may evaluate meeting locations of meetings to determine whether user participants can attend both meetings. For example, if a first meeting event is in one location and a second meeting event is at a location that is 20 miles away from the first meeting, then processing logic may not schedule the first and second meeting back-to-back based upon the travel time needed.

In an embodiment, processing logic may be configured to dynamically schedule reoccurring meetings based upon availability of participants for the current week and subsequent weeks without being constrained of ensuring the same meeting timeslot is free for each of the subsequent weeks. For example, traditional meeting scheduling systems may not allow schedule of a reoccurring meeting if a participant is busy at the scheduled time during future weeks. Processing logic however, may dynamically reschedule future meetings of a reoccurring meeting in order to allow the meeting to be scheduled for the current week. This allows the first meeting event to be scheduled at a meeting time for the first week even if that same meeting time for subsequent weeks is marked as busy for one or more participants. Processing logic may then simultaneously or subsequently reschedule future meeting times for the reoccurring meeting to accommodate for participants' schedules.

Referring back to FIG. 4, after target timeslots have been determined for the one or more meetings to be rescheduled, processing logic, at decision diamond 406, determines whether meeting constraints for the one or more meetings are satisfied by the new target timeslots. In an embodiment, processing logic evaluates meeting constraints for each of the one or more meetings to be rescheduled to determine whether the target timeslots violate the meeting constraints. For example, meeting room locations for the one or more meetings may be checked to ensure that there is no double booking. In an embodiment, processing logic may be configured to search for available meeting locations in the event of a double booking situation. In another example, processing logic may evaluate time constraints on meetings to determine whether the target timeslot does not violate a meeting time constraint. For example, if one of the meetings is an emergency or priority meeting that needs to be held before a certain date or before another meeting, then processing logic would evaluate whether the target timeslot satisfies the current meeting constraint.

In an embodiment, processing logic may also determine whether the new target timeslots are compatible with user preferences for participants. For example, processing logic may evaluate factors such as geo-locations of users before and after the target timeslot to determine whether factors such as travel time may impact whether a user can attend the meeting and the target timeslot. If a user is unable to attend the meeting at the target timeslot, then processing logic may proceed back to block 404 to determine new target timeslots.

If at decision diamond 406 processing logic determines that one or more meeting constraints are violated, then processing logic proceeds back to block 404 to determine new target timeslots. If, however, processing logic determines that the one or more meeting constraints are not violated, then processing logic proceeds to block 408 to generate updated user schedules.

At block 408, processing logic generates proposed updated user schedules that reflect rescheduling of the one or more meetings to the target timeslots. In an embodiment, processing logic generates sets of proposed updated user timeslots for the user schedules that reflect the new meeting times of the one or more meetings.

Referring back to FIG. 2A at block 210, processing logic generates recalculated scores for the sets of proposed updated timeslots. In an embodiment, processing logic may be configured to generate recalculated scores for sets of updated timeslots that contain updates to the user schedules. For example, at block 208, the one or more rescheduling moves may only have affected user schedules for a subset of users. The remaining users not within the subset of users may have unchanged user schedules and as a result their scores would remain unchanged. Processing logic may be configured to determine the subset of users that have updated user schedules and only generate recalculated scores for the user schedules that have changed. Only recalculating scores for sets of timeslots of for user schedules that have changes may conserve processing resources as only a subset of user schedules will need to be recalculated.

In an embodiment, processing logic may further be configured to only recalculate scores for timeslots within user schedules that contain changes. For example, user schedule for user A may have only 4 timeslots out of the set of timeslots that contain changes. Processing logic may then be configured to recalculate scores for the 4 timeslots containing changes while original scores for the remaining timeslots may be used to calculate the overall recalculated score for user A's user schedule.

Figure 5C:
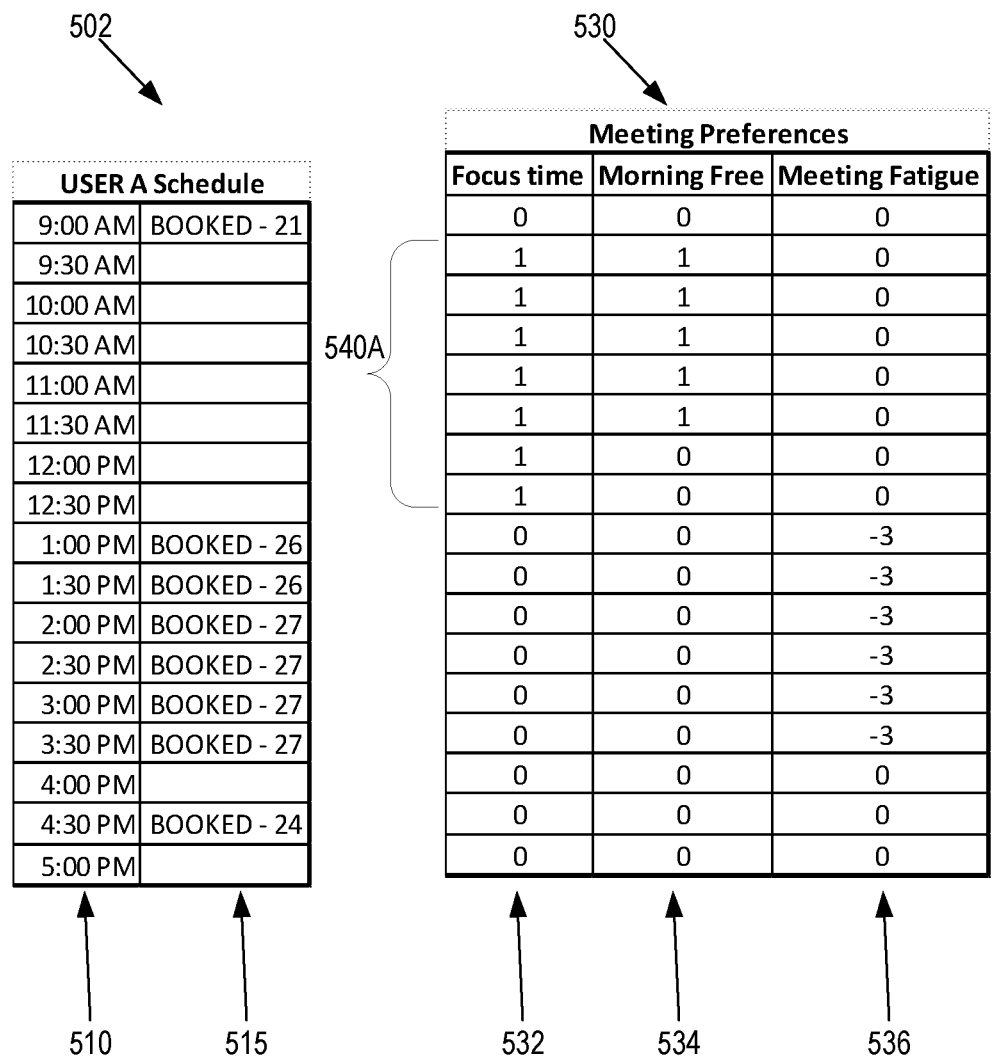
FIG. 5C illustrates an example scoring matrix for an updated user schedule associated with a user containing a rescheduled meeting.

In an embodiment, processing logic may be configured to recalculate timeslots near a timeslot containing changes as the optimization scores of nearby timeslots may have been affected. FIG. 5C illustrates an example scoring matrix for an updated user schedule associated with a user containing a rescheduled meeting. User schedule 502A represents an updated user schedule for user A that contains a meeting that was originally scheduled for 10:30 AM that has now been rescheduled for 4:30 PM. The meeting preferences 530A reflect recalculated scores that are based upon removing the meeting at 10:30 AM and placing the meeting at the 4:30 PM. As a result, processing logic may recalculate the 10:30 AM timeslot to award a point for mornings free. Additionally, processing logic may recalculate timeslots for 9:30 AM-11:00 AM as the focus time block has increased from 9:30 AM to 12:30 PM. As a result, timeslots between scores 9:30 AM to 12:30 PM each receive a point, illustrated as scores 540A.

Referring back to FIG. 2A, at block 211 processing logic calculates a second total combined score based on the recalculated scores for the sets of timeslots of multiple users. The goal is to increase the total combined score with each set of rescheduling moves. At decision diamond 212, processing logic determines whether the one or more rescheduling moves increases the total combined score based upon a comparison of the calculated scores to the recalculated scores (e.g., based on a comparison of the first combined score to the second combined score). If the one or more rescheduling moves results in an increased total combined score, then processing logic proceeds to block 214 to generate one or more meeting updates for the one or more rescheduling moves. If however, the one or more rescheduling moves do not result in an increased total combined score, then processing logic proceeds back to block 208 to determine a new set of one or more rescheduling moves.

At block 214, processing logic generates one or more meeting updates to reschedule the one or more meetings in the set of user schedules. In an embodiment, the generated one or more meeting updates may be formatted to comply with the calendar service running on the calendar server computing device 120. For example, if the calendar server computing device 120 is running Microsoft Exchange Server then the one or more meeting updates may be Microsoft Outlook compatible meeting updates. The one or more meeting updates may include meeting updates for each user participant in each of the meetings that are to be rescheduled. In an embodiment, processing logic may be configured to send the one or more meeting updates to the calendar server computing device 120 via the network 131.

FIG. 2B is a flow diagram illustrating another embodiment of a method for optimizing user meeting schedules for users based upon meeting scheduling preferences and multiple rescheduling rules. Blocks 202-212 of method 220 represent acts performed by processing logic that are the same as method 200 of FIG. 2A.

At decision diamond 212, if processing logic determines that the one or more rescheduling moves results in an increased combined score, then processing logic proceeds to block 222. At block 222, processing logic generates updated sets of timeslots for the set of user schedules based upon the one or more rescheduling moves determined at block 208. In an embodiment, processing logic may temporarily store the updated sets of timeslots and the one or more rescheduling moves to be applied when generating one or more meeting updates in schedule repository 170. In another embodiment, processing logic may store the updated sets of timeslots within local or a remote cache of the server computing device 150. The updated sets of timeslots may then be used when determining additional rescheduling moves.

At decision diamond 224, processing logic may determine whether additional rescheduling rules are to be used to determine an additional set of rescheduling moves based upon the updated sets of timeslots. In an embodiment, processing logic may be configured to evaluate the recalculated optimization score to determine whether a target optimization level has been reached. A target optimization level may represent a desired level of meeting optimization that has been defined by an administrator, team lead, department head, or any other person or metric used to evaluate optimization success. If the desired level of optimization has been achieved, then processing logic may proceed to block 226 to generate the one or more meeting updates based on the one or more rescheduling moves. If, however, additional rescheduling rules are to be applied to further improve optimization, then processing logic may proceed to block 208 to determine one or more additional rescheduling moves on the updated sets of timeslots.

At block 208, processing logic may determine one or more rescheduling moves for the scheduled meetings within the updates sets of timeslots using a rescheduling rule. In an embodiment, processing logic may select a different rescheduling rule than the one previously used. In another embodiment, processing logic may reselect the same rescheduling rule as previously selected. Selecting the same rescheduling rule may result in one or more rescheduling moves that may further optimize the user schedules.

At block 226, processing logic may generate one or more updates based on the one or more rescheduling moves. In an embodiment, if multiple sets of rescheduling moves during multiple rounds of determining rescheduling moves have been generated, then processing logic may be configured to interpret the multiple set of rescheduling moves in order to generate the one or more meeting updates. For example, if block 208 is performed 5 times then there would be 5 sets of rescheduling moves. Within the 5 sets of rescheduling moves a particular meeting may have been moved multiple times. The processing logic may be configured to determine the initial and final schedule position of the particular meeting in order to generate a single set of meeting updates for the particular meeting.

In an embodiment, processing logic may be configured to optimize meeting locations for meeting events in order to ensure that the capacity of the meeting rooms can handle the user participants for each meeting event. For example, if a meeting event has 10 user participants but is scheduled in a meeting room that has capacity for only 6 users, then processing logic may be configured to reschedule the meeting event time or the meeting location.

In an embodiment, processing logic may be configured to generate new meeting events directly within the schedule optimization service. For example, the processing logic may receive a request for a new meeting from a user, either directly from computing device 101A or via the calendar server computing system 120. The request for a new meeting may include a participant list of users, a range of acceptable times for the meeting, and a list of one or more preferred meeting locations. Processing logic may then analyze the user schedules of the meeting participants as well as the range of acceptable times to determine a meeting time and location. In an embodiment, processing logic may dynamically schedule the meeting time and/or location during a rescheduling event of one or more other meetings or may initiate a rescheduling event if no open timeslots are available to accommodate each of the participants.

Referring to FIG. 2A, scheduling a new meeting event may begin at block 206 where scores are calculated for the sets of timeslots for the user schedules. At block 207, a first combined score may be calculated for set of user schedules. At block 208, processing logic may determine a target destination for the new meeting event based upon the sets of timeslots for the users in the meeting participant list. At block 210 recalculated scores are generated from the sets of timeslots. At block 211, a second combined score is calculated for the user schedules. In an embodiment, when adding the new meeting event at decision diamond 212 processing logic may determine whether the newly added meeting event increases the combined score or at least maintains the same combined score for the users. If the combined score decreases by a configured amount, processing logic may return to block 208 to determine one or more rescheduling moves of one or more meetings in order to accommodate for the newly added meeting.

Figure 6:
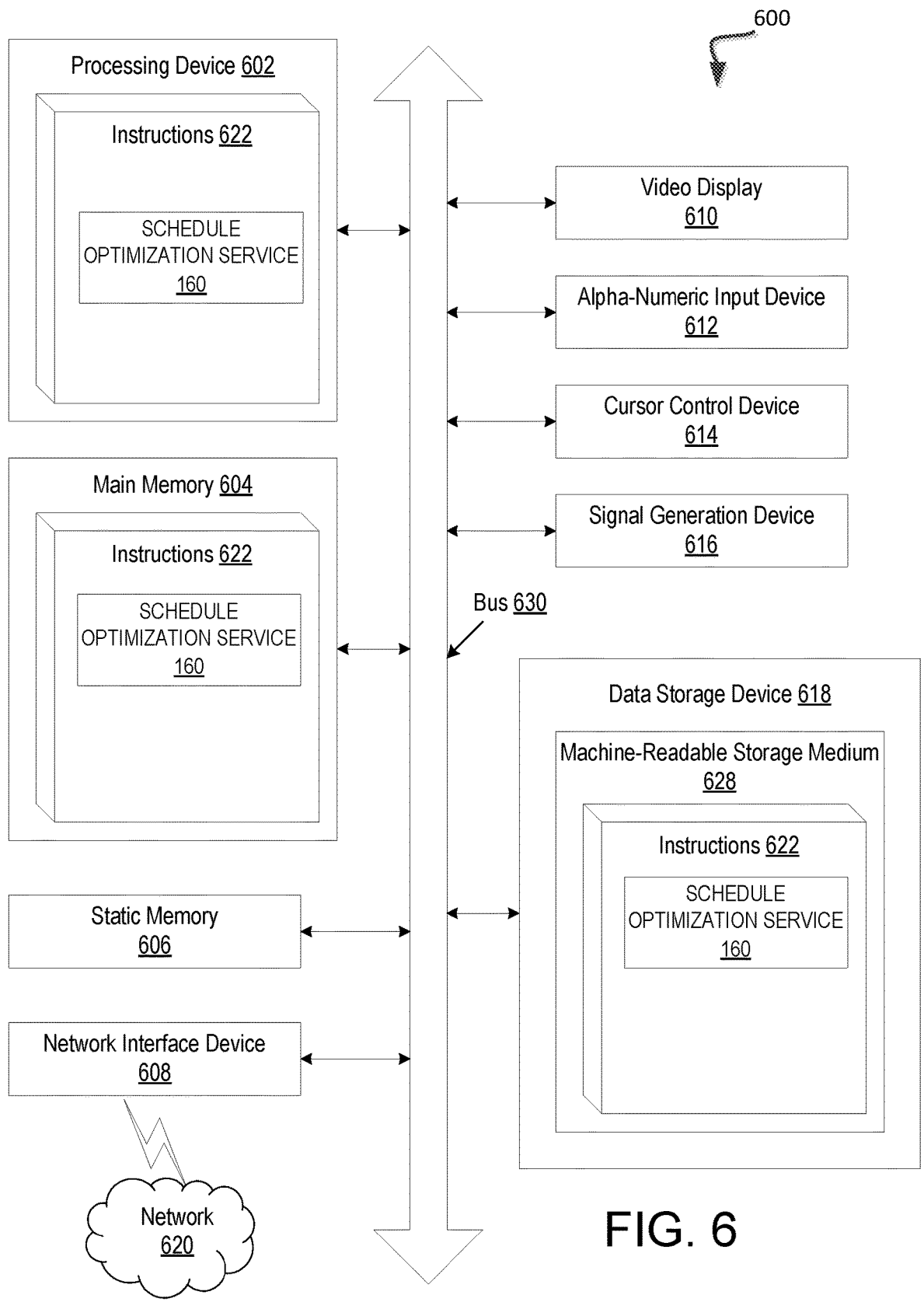
FIG. 6 is a block diagram illustrating an exemplary computer system, according to an embodiment.

FIG. 6 illustrates a diagrammatic representation of a machine in the exemplary form of a computing device 600 within which a set of instructions, for causing the machine to perform any one or more of the methodologies discussed herein, may be executed. The computing device 600 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 600 may represent computing devices 101A-Z, server computing device 150 and/or calendar server computing device 120, as shown in FIG. 1.

The computing device 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the schedule optimization service 160 for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of schedule optimization service 160) embodying any one or more of the methodologies or functions described herein. The instructions 622 may also reside, completely or at least partially, within the main memory 604 and/or within processing logic 626 of the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, performed by one or more processor, of iteratively optimizing schedules of a plurality of users using a plurality of rescheduling algorithms, comprising:
    receiving, by the one or more processor executing a communication logic, calendar data for the plurality of users, wherein the calendar data includes meeting data describing meeting schedules for each of the plurality of users;
    generating, by the one or more processor executing a user schedule logic, a set of user schedules for the plurality of users based upon the calendar data, wherein each user schedule comprises a set of timeslots, each timeslot represents a time window within a day, and each timeslot contains an indication of whether a meeting is scheduled during that timeslot for the user, and wherein an amount of computing resources required to assess all possible permutations of meeting options for the set of user schedules causes all of the possible permutations of meeting options for the set of user schedules to be combinatorically prohibitive to assess; and
    iteratively optimizing the set of user schedules for the plurality of users in a manner that results in an optimized set of user schedules while assessing a reduced number of possible permutations of meeting options, wherein iteratively optimizing the set of user schedules comprises:
    calculating, by the one or more processor executing a timeslot scoring logic, a first combined score for the set of user schedules based on meeting preferences;
    determining, by the one or more processor executing a rescheduling logic, one or more first rescheduling moves for the scheduled nneetings within the sets of timeslots using a first rescheduling algorithm of the plurality of rescheduling algorithms, wherein the first rescheduling algorithm assesses a first reduced number of permutations of combinations of meeting options using a first reduced amount of computational resources to determine the one or more first rescheduling moves;
    calculating, by the one or more processor executing the timeslot scoring logic, a second combined score based at least in part on the one or more first rescheduling moves for the set of user schedules;
    determining, by the one or more processor executing the rescheduling logic, whether the second combined score is higher than the first combined score;
    responsive to determining that the second combined score is higher than the first combined score, generating, by the one or more processor executing the rescheduling logic, one or more first meeting updates to reschedule one or more meetings in the set of user schedules based on the one or more first rescheduling moves;
    generating, by the one or more processor executing the rescheduling logic, updated sets of timeslots for the scheduled meetings based on the one or more first rescheduling moves;
    determining, by the one or more processor executing the rescheduling logic, one or more second rescheduling moves for the scheduled meetings within the updated sets of timeslots using a second rescheduling algorithm of the plurality of rescheduling algorithms, wherein the second rescheduling algorithm assesses a second reduced number of permutations of combinations of meeting options using a second reduced amount of computational resources to determine the one or more second rescheduling moves;
    generating, by the one or more processor executing the timeslot scoring logic, a third combined score based at least in part on the one or more second rescheduling moves for the set of user schedules;
    determining, by the one or more processor executing the rescheduling logic, whether the third combined score is higher than the second combined score; and
    responsive to determining that the third combined score is higher than the second combined score, generating, by the one or more processor executing the rescheduling logic, one or more second meeting updates to reschedule the one or more meetings in the set of user schedules, wherein the one or more second meeting updates override at least one of the one or more first meeting updates;
    wherein a total amount of computational resources used to perform iterative application of the plurality of rescheduling algorithms and determine at least the one or more first meeting updates and the one or more second meeting updates is below the amount of computing resources required to assess all possible permutations of meeting options for the set of user schedules as a result of an amount of assessed permutations of combinations of the meeting options, which comprises the first reduced number of permutations and the second reduced number of permutations, being less than all of the possible permutations of meeting options.

2. The method of claim 1, performed by the one or more processor, wherein the meeting preferences include at least one of: preferred meeting times, preferred number of consecutive meetings, preferred timeslots to be free of meetings, or preferred timeslots for personal appointments.

3. The method of claim 1, performed by the one or more processor, wherein the meeting preferences include user specific meeting preferences for at least one of the plurality of users.

4. The method of claim 1, performed by the one or more processor, wherein generating the set of user schedules for the plurality of users based upon the calendar data further comprises implementing deduplication to generate a single meeting event from the calendar data that includes multiple meeting events for multiple users that represent the single meeting event.

5. The method of claim 1, performed by the one or more processor, wherein the calendar data is received from a calendar server, the method further comprising:
    sending, by the one or more processor executing the communication logic, at least one of the one or more first meeting updates or the one or more second meeting updates to the calendar server to update the meeting schedules for the plurality of users.

6. The method of claim 1, performed by the one or more processor, wherein determining the one or more first rescheduling moves for the scheduled meetings comprises:
   determining, by the one or more processor executing the rescheduling logic, one or more new timeslots for the scheduled meetings based upon location information associated other scheduled meetings of users of the scheduled meetings that are near in time to the one or more new timeslots; and
   determining, by the one or more processor executing the rescheduling logic, the one or more first rescheduling moves for the scheduled meetings using the first rescheduling algorithm and the determined one or more new timeslots.

7. The method of claim 1, performed by the one or more processor, wherein the first rescheduling algorithm is configured to alter duration of meetings based upon the meeting preferences and available free timeslots.

8. The method of claim 1, performed by the one or more processor, wherein:
   calculating the first combined score for the set of user schedules comprises:
      calculating scores for sets of timeslots based upon meeting preferences and scheduled meetings within the sets of timeslots; and
      calculating the first combined score based on the scores for the sets of timeslots; and
   calculating the second combined score based at least in part on the one or more first rescheduling moves for the set of user schedules comprises:
      generating recalculated scores for the sets of timeslots based at least in part upon the one or more first rescheduling moves; and
      calculating the second combined score based on the recalculated scores for the sets of timeslots.

9. The method of claim 8, performed by the one or more processor, wherein calculating the scores for the sets of timeslots comprises:
   for each timeslot in the sets of timeslots:
      calculating a first preference score based upon a first preference from the meeting preferences;
      calculating a second preference score based upon a second preference from the meeting preferences; and
      aggregating the first preference score and the second preference score to generate a combined score for the timeslot; and
   aggregating the combined scores from timeslots in a set of timeslots from the sets of timeslots to generate the score for the set of timeslots.

10. The method of claim 9, performed by the one or more processor, wherein the first preference score is assigned a first weight and the second preference score is assigned a second weight.

11. The method of claim 8, performed by the one or more processor, wherein generating the recalculated scores for the sets of timeslots based upon the one or more first rescheduling moves comprises:
   for a subset of timeslots in the sets of timeslots that are part of the one or more first rescheduling moves, generating a recalculated timeslot score; and
   generating the recalculated scores for the sets of timeslots by aggregating the recalculated timeslot scores for the subset of timeslots and scores of other timeslots not part of the subset of timeslots in the sets of timeslots that have been previously calculated.

12. The method of claim 1, performed by the one or more processor, wherein generating the set of user schedules for the plurality of users comprises:
   generating subsets of users from the plurality of users based upon calendar data and overlapping meeting schedules; and
   generating the set of user schedules for the subsets of users, wherein each user schedule comprises the set of timeslots and each timeslot contains an indication of whether a meeting is scheduled for a subset of users.

13. The method of claim 1, performed by the one or more processor, wherein the first rescheduling algorithm is based upon generating two or more consecutive timeslots within the user schedules for the plurality of users that are free of meetings.

14. The method of claim 1, performed by the one or more processor, wherein the first rescheduling algorithm is based upon swapping two or more meetings in the user schedules in order to increase scores for the sets of timeslots.

15. A server computing system comprising:
   at least one processor; and
   a memory storing instructions executable by the at least one processor, wherein the instructions, when executed, cause the at least one process or to:
   receive, using a communication logic, calendar data for a plurality of users, wherein the calendar data includes meeting data describing meeting schedules for each of the plurality of users;
   generate, using a user schedule logic, a set of user schedules for the plurality of users based upon the calendar data, wherein each user schedule comprises a set of timeslots, each timeslot represents a time window within a day, and each timeslot contains an indication of whether a meeting is scheduled during that timeslot for the user, and wherein an amount of computing resources required to assess all possible permutations of meeting options for the set of user schedules causes all of the possible permutations of meeting options for the set of user schedules to be combinatorically prohibitive to assess; and
   iteratively optimize the set of user schedules for the plurality of users in a manner that results in an optimized set of user schedules while assessing a reduced number of possible permutations of meeting options, wherein to iteratively optimize the set of user schedules the at least one processor is to:
      calculate, using a timeslot scoring logic, a first combined score for the set of user schedules based on meeting preferences;
      determine, using a rescheduling logic, one or more first rescheduling moves for the scheduled meetings within the sets of timeslots using a first rescheduling algorithm of a plurality of rescheduling algorithms, wherein the first rescheduling algorithm assesses a first reduced number of permutations of combinations of meeting options using a first reduced amount of computational resources to determine the one or more first rescheduling moves;
      calculate, using the timeslot scoring logic, a second combined score based at least in part on the one or more rescheduling moves for the set of user schedules;
      determine, using the rescheduling logic, whether the second combined score is higher than the first combined score;
      responsive to determining that the second combined score is higher than the first combined score, generate, using the rescheduling logic, one or more first meeting updates to reschedule one or more meetings in the set of user schedules based on the one or more first rescheduling moves;

generate, using the rescheduling logic, updated sets of timeslots for the scheduled meetings based on the one or more first rescheduling moves;

determine, using the rescheduling logic, one or more second rescheduling moves for the scheduled meetings within the updated sets of timeslots using a second rescheduling algorithm of the plurality of rescheduling algorithms, wherein the second rescheduling algorithm assesses a second reduced number of permutations of combinations of meeting options using a second reduced amount of computational resources to determine the one or more second rescheduling moves;

generate, using the timeslot scoring logic, a third combined score based at least in part on the one or more second rescheduling moves for the set of user schedules;

determine, using the rescheduling logic, whether the third combined score is higher than the second combined score; and responsive to determining that the third combined score is higher than the second combined score, generate, using the rescheduling logic, one or more second meeting updates to reschedule the one or more meetings in the set of user schedules, wherein the one or more second meeting updates override at least one of the one or more first meeting updates;

wherein a total amount of computational resources used to perform iterative application of the plurality of rescheduling algorithms and determine at least the one or more first meeting updates and the one or more second meeting updates is below the amount of computing resources required to assess all possible permutations of meeting options for the set of user schedules as a result of an amount of assessed permutations of combinations of the meeting options, which comprises the first reduced number of permutations and the second reduced number of permutations, being less than all of the possible permutations of meeting options.

16. The system of claim 15, wherein the meeting preferences include at least one of: preferred meeting times, preferred number of consecutive meetings, preferred timeslots to be free of meetings, or preferred timeslots for personal appointments.

17. The system of claim 15, wherein the meeting preferences include user specific meeting preferences for at least one of the plurality of users.

18. The system of claim 15, wherein to generate the set of user schedules for the plurality of users based upon the calendar data further comprises implementing deduplication to generate a single meeting event from the calendar data that includes multiple meeting events for multiple users that represent the single meeting event.

19. The system of claim 15, wherein the calendar data is received from a calendar server, the at least one processor further to: send, using the communication logic, at least one of the one or more first meeting updates or the one or more second meeting updates to the calendar server to update the meeting schedules for the plurality of users.

20. The system of claim 15, wherein to determine the one or more first rescheduling moves for the scheduled meetings comprises:

determine one or more new timeslots for the scheduled meetings based upon location information associated other scheduled meetings of users of the scheduled meetings that are near in time to the one or more new timeslots; and determine the one or more first rescheduling moves for the scheduled meetings within the sets of timeslots using the first rescheduling algorithm and the determined one or more new timeslots.

21. The system of claim 15, wherein the first rescheduling algorithm is configured to alter duration of meetings based upon the meeting preferences and available free timeslots.

22. The system of claim 15, wherein:

to calculate the first combined score for the set of user schedules comprises:

calculate scores for sets of timeslots based upon meeting preferences and scheduled meetings within the sets of timeslots; and calculate the first combined score based on the scores for the sets of timeslots; and to calculate the second combined score based at least in part on the one or more first rescheduling moves for the set of user schedules comprises:

generate recalculated scores for the sets of timeslots based at least in part upon the one or more first rescheduling moves; and calculate the second combined score based on the recalculated scores for the sets of timeslots.

23. The system of claim 22, wherein to calculate the scores for the sets of timeslots comprises:

for each timeslot in the sets of timeslots:

calculate a first preference score based upon a first preference from the meeting preferences;

calculate a second preference score based upon a second preference from the meeting preferences; and aggregate the first preference score and the second preference score to generate a combined score for the timeslot; and aggregate the combined scores from timeslots in a set of timeslots from the sets of timeslots to generate the score for the set of timeslots.

24. The system of claim 23, wherein the first preference score is assigned a first weight and the second preference score is assigned a second weight.

25. The system of claim 22, wherein to generate the recalculated scores for the sets of timeslots based upon the one or more first rescheduling moves comprises:

for a subset of timeslots in the sets of timeslots that are part of the one or more first rescheduling moves, generate a recalculated timeslot score; and generate the recalculated scores for the sets of timeslots by aggregating the recalculated timeslot scores for the subset of timeslots and scores of other timeslots not part of the subset of timeslots in the sets of timeslots that have been previously calculated.

26. The system of claim 15, wherein to generate the set of user schedules for the plurality of users comprises:

generate subsets of users from the plurality of users based upon calendar data and overlapping meeting schedules; and generate the set of user schedules for the subsets of users, wherein each user schedule comprises the set of timeslots and each timeslot contains an indication of whether a meeting is scheduled for a subset of users.

27. The system of claim 15, wherein the first rescheduling algorithm is based upon generating two or more consecutive timeslots within the user schedules for the plurality of users that are free of meetings.

28. The system of claim 15, wherein the first rescheduling algorithm is based upon swapping two or more meetings in the user schedules in order to increase scores for the sets of timeslots.

\* \* \* \* \*